United States Patent
Steele et al.

(10) Patent No.: US 7,987,165 B2
(45) Date of Patent: Jul. 26, 2011

(54) INDEXING SYSTEM AND METHOD

(75) Inventors: Robert James Steele, New South Wales (AU); David Martin Powers, Bellevue Heights (AU)

(73) Assignee: Youramigo Limited, Adeliade (AU)

( * ) Notice: Subject to any disclaimer, the term of this patent is extended or adjusted under 35 U.S.C. 154(b) by 530 days.

(21) Appl. No.: 10/168,132

(22) PCT Filed: Dec. 18, 2000

(86) PCT No.: PCT/AU00/01554
§ 371 (c)(1),
(2), (4) Date: Jan. 14, 2003

(87) PCT Pub. No.: WO01/46856
PCT Pub. Date: Jun. 28, 2001

(65) Prior Publication Data
US 2003/0191737 A1    Oct. 9, 2003

(30) Foreign Application Priority Data
Dec. 20, 1999   (AU) ...................................... PQ4757

(51) Int. Cl.
*G06F 7/00*   (2006.01)
*G06F 17/00*   (2006.01)
(52) U.S. Cl. .................... 707/702; 707/673; 707/696
(58) Field of Classification Search ................. 707/2, 8, 707/9, 10; 709/203, 217
See application file for complete search history.

(56) References Cited

U.S. PATENT DOCUMENTS

| | | | |
|---|---|---|---|
| 5,649,186 A | | 7/1997 | Ferguson |
| 5,765,168 A | | 6/1998 | Burrows |
| 5,806,065 A | | 9/1998 | Lomet |
| 5,864,863 A | | 1/1999 | Burrows |
| 5,926,816 A | | 7/1999 | Bauer et al. |
| 5,963,944 A | | 10/1999 | Adams |
| 5,974,412 A | | 10/1999 | Hazlehurst et al. |
| 5,978,799 A | | 11/1999 | Hirsch |
| 6,088,694 A | * | 7/2000 | Burns et al. ....................... 707/8 |
| 6,338,085 B1 | * | 1/2002 | Ramaswamy ............... 709/217 |
| 6,418,452 B1 | * | 7/2002 | Kraft et al. ................... 707/200 |
| 6,516,337 B1 | * | 2/2003 | Tripp et al. ................... 709/202 |
| 6,546,387 B1 | * | 4/2003 | Triggs ............................... 707/5 |
| 6,675,205 B2 | * | 1/2004 | Meadway et al. ........... 709/219 |
| 6,931,598 B2 | * | 8/2005 | Price et al. ................... 715/760 |
| 6,976,053 B1 | * | 12/2005 | Tripp et al. ................... 709/202 |
| 2002/0069196 A1 | * | 6/2002 | Betros et al. ..................... 707/7 |

FOREIGN PATENT DOCUMENTS

JP    9-204442    8/1997

(Continued)

OTHER PUBLICATIONS

Linn, C.N.; "A Multi-Agent System for Cooperative Document Indexing and Querying in Distributed Networked Environments"; *International Workshop on Parallel Processing*; pp. 21-24; Sep. 1999.

(Continued)

*Primary Examiner* — Susan Y Chen
(74) *Attorney, Agent, or Firm* — Nixon & Vanderhye P.C.

(57) ABSTRACT

An indexing system, including a server for providing access to at least one site, a server agent for creating an index file of data relating to the site, and a central index for storing index information from the index file. The server agent initiates communication with the central index to transfer the index file from the server agent to the central index.

26 Claims, 25 Drawing Sheets

FOREIGN PATENT DOCUMENTS

| | | |
|---|---|---|
| JP | 9-218880 | 8/1997 |
| JP | 10-063686 | 3/1998 |

OTHER PUBLICATIONS

Crimmins, F., et al; "TétraFusion: Information Discovery on the Internet"; *IEEE Intelligent Systems*; pp. 55-62; Jul./Aug. 1999.

Viles, C.L., et al; "Dissemination of Collection Wide Information in a Distributed Information Retrieval System"; pp. 1-9; *18th Annual International ACM-SIGIR*, Jul. 1995.

Supplementary Partial European Search Report; European Application No. EP 00986857.1-2201; PCT/AU0001554, Apr. 19, 2007.

English Translation of Japanese Patent Office Publication No. 9-204442.

English Translation of Japanese Patent Office Publication No. 9-218880.

English Translation of Japanese Patent Office Publication No. 10-63686.

First Office Action, Notification of Reasons for Refusal, dispatched Jul. 13, 2010, Japanese Application No. 2001-547303 and it's English translation.

\* cited by examiner

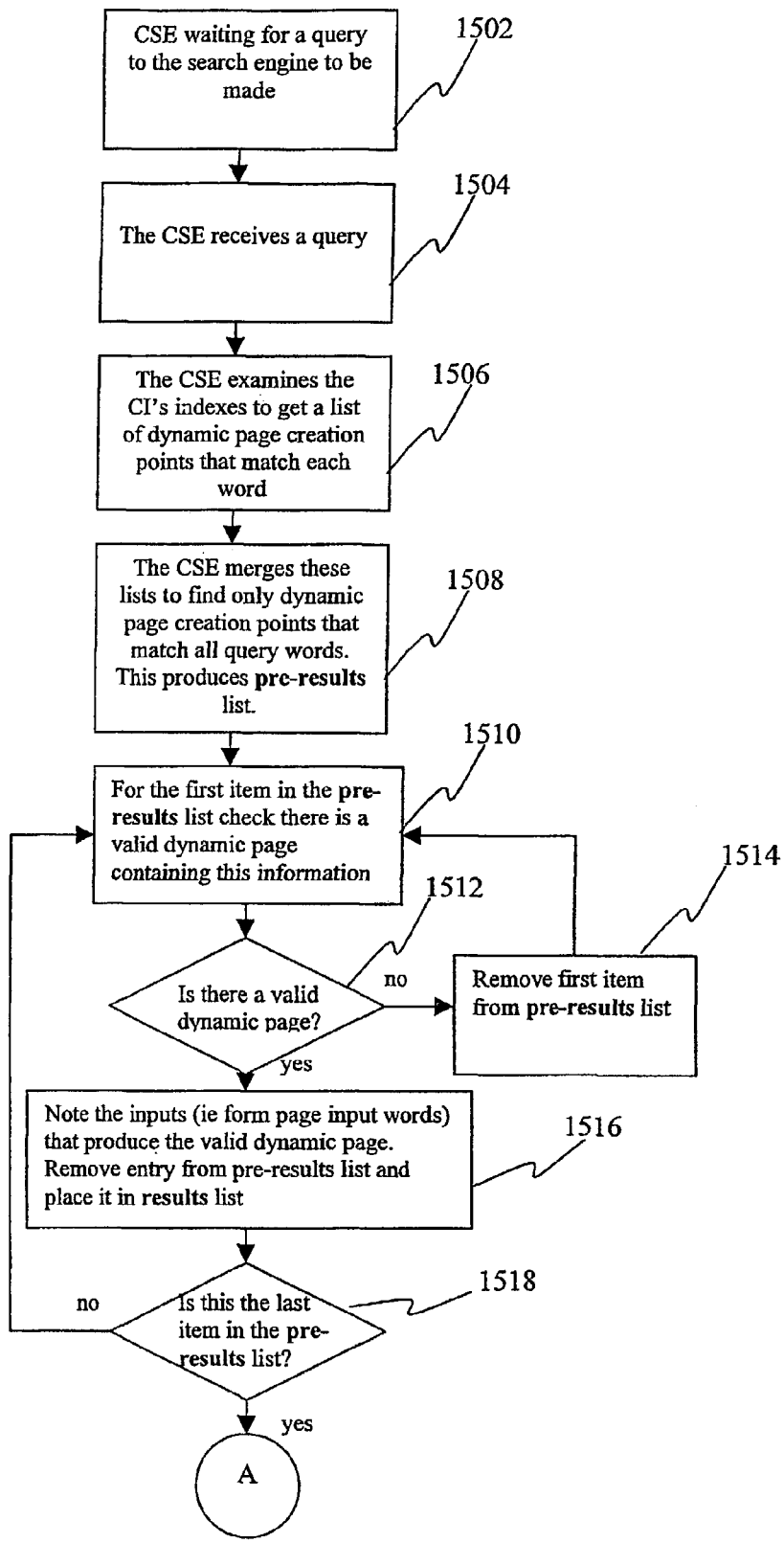
Fig 15A CSE

INDEXING SYSTEM AND METHOD

The application is the U.S. national phase of International Application No. PCT/AU00/01554 filed Dec. 18, 2000 which claims priority to PQ 4757/99, filed Dec. 20, 1999.

FIELD OF THE INVENTION

The present invention relates to a method and system for generating an index of data accessible from a server and, in particular, for producing an index for information contained on the Internet.

BACKGROUND OF THE INVENTION

One of the features of a distributed communications network, such as the Internet, is that it provides largely unrestricted access to and freedom to publish data on the network. Yet as the network grows it becomes extremely difficult for users to locate required data, and even more difficult to maintain a comprehensible or useful index or portal to the data. The data may include text, graphics, video, audio, and program data or code. The growth of the Internet, which has effectively no central controlling authority, has been such that locating required data is now sometimes akin to locating a needle in a hay stack. Nevertheless, a number of companies maintain search engines and portals to Internet data, particularly the data published on the World Wide Web.

Most search engines rely on an index of web pages that the engine is able to search on the basis of query terms, such as key words. The index is normally provided by a database of web addresses, ie universal resource locators (URLs), and terms of text information are used to represent each page of text placed on the web.

Most search engines, such as Lycos, Hotbot, and the like, acquire an index using a spidering program to retrieve a web page, typically through the usual HTTP protocol, and extract the data from this page that is to be indexed. At the same time, links to other pages are noted, and the process is then repeated for the newly discovered links. This is performed automatically, and so no co-operation is required from the administrator or author of the web-site visited. However, the pages are all brought to a central site for processing, and due to the volume of data to be processed it is common that a new or modified page will wait for several months before being processed.

Distributed indexers are available, such as Aliweb. In this system, the indexing information is manually entered into templates by the system administrator or the author of the page. The pages are then available to a spidering program for retrieval. Since the information about a page is generated by a human, the information about page content is usually very accurate. However, many administrators and authors are not prepared to provide such information, and those that are often do not spend sufficient time to complete the template, and so the index is frequently incomplete, and out of date.

In another type of search engine, such as that originally provided by Yahoo, the index is constructed by a manual inspection of pages by humans. Since the inspection is manual, the categorization of web pages under particular topics is generally fairly accurate, as are the ratings of the quality of the pages. However, the limited number of people available limits the extent to which the web is covered, and the rate at which new and modified web pages are reviewed.

Client based search engines, such as Fish, are based at individual searchers or web users. They offer greater scope for an agreeable user interface, and for personalized searching. However, they have the potential for wasting large amounts of bandwidth if independently searching a substantial portion of the web.

Some search engines, for example MetaCrawler and Dogpile, upon receiving a search request, search the search sites of other search engines, receive the results from these and consolidate the results for display to the user (this is known as a metasearch). This leads to better coverage of the web, since some search engines include data from sites not visited by other search engines. However, this is an inefficient approach, since there is considerable overlap between different search indices, there is also an additional delay in returning the results to the user, and methods available for ranking the results in a relevant order are limited.

Another type of distributed search engine, such as Harvest, has units, called Gatherers, at different web servers to look through the site, index its contents and place them in a file that is stored at the site. These index files can be retrieved by programs known as Brokers, which are activated by users for a particular search. This approach saves on bandwidth use, but a spider still has to visit the site on a regular basis to ensure that the index stored at the server is regularly updated.

Indexing of web pages available on the Internet poses a number of difficulties. These include the dynamism of the Internet itself, and the dynamism of the information on the Internet. This results in a situation where there are no completely up-to-date and complete indices for the web.

Another significant problem is that most of the information on the Internet (estimated at more than 90%) is located in databases which are used as the basis for dynamic pages. Dynamic pages are those that are not written by hand in html, but rather the html that constitutes them is made by a program or script "dynamically", or information is presented in some other way, eg using Java. These pages are constructed by a program at the time at which the user submits a query. Current indexing methods such as spidering are not able to index dynamic pages, nor the databases used for creating dynamic pages.

SUMMARY OF THE INVENTION

In accordance with the present invention, there is provided a method for generating an index of data accessible from a server, including:

processing data on said server to access data items for a central index, said data items including network addresses and terms;

compiling an index file including said data items; and transmitting said index file to said central index.

The present invention also provides an agent having components for executing the steps of the method.

Preferably the method further includes:

receiving said index file at said central index, which has an index database; and maintaining said index database on the basis of entries in said index file, said index database being adapted for use by a search engine The present invention also provides an index of data accessible from servers, including:

page entries including a program address for a program for generating a dynamic page and input tuples for submission to the program to generate the page; and search entries identifying the dynamic pages and identifying the tuples corresponding to search terms.

The present invention also provides a search engine operable on the index, including:

means for accessing the search entries to identify dynamic pages corresponding to search terms of a search query; and means for accessing the page entries to generate addresses for the dynamic pages identified, said addresses being generated on the basis of said program address and said tuples.

The present invention also provides an indexing system including the agent, the index and the search engine.

The present invention also provides an indexing system, including:

a server for providing access to at least one site;

a server agent for creating an index file of data relating to the site; and a central index for storing index information from the index file, wherein the server agent initiates communication with the central index for transfer of the index file.

The present invention also provides a method of indexing, including:

providing a server agent for indexing sites provided by a server;

compiling an index file representing site data of the sites; and transmitting the file to a central index, wherein the server agent initiates communication with the central index for transfer of the index file.

The present invention also provides a method for indexing dynamic pages including:

identifying at least one database accessed in producing a dynamic page;

determining the parameters and environment variables of the database;

determining a relationship between input fields of the page and the database;

identifying columns of the database that correspond to inputs; and storing data of the rows of the database that can be accessed via the inputs in an index file.

The present invention also provides a browser agent, executable on a user computer system, having means for communicating with an index of an indexing system to determine a change in a network address stored on said user computer system

BRIEF DESCRIPTION OF THE DRAWINGS

Preferred embodiments of the present invention are hereinafter described, by way of example only, with reference to the accompanying drawings, wherein.

DETAILED DESCRIPTION OF PREFERRED EMBODIMENTS OF THE INVENTION

Figure 2:
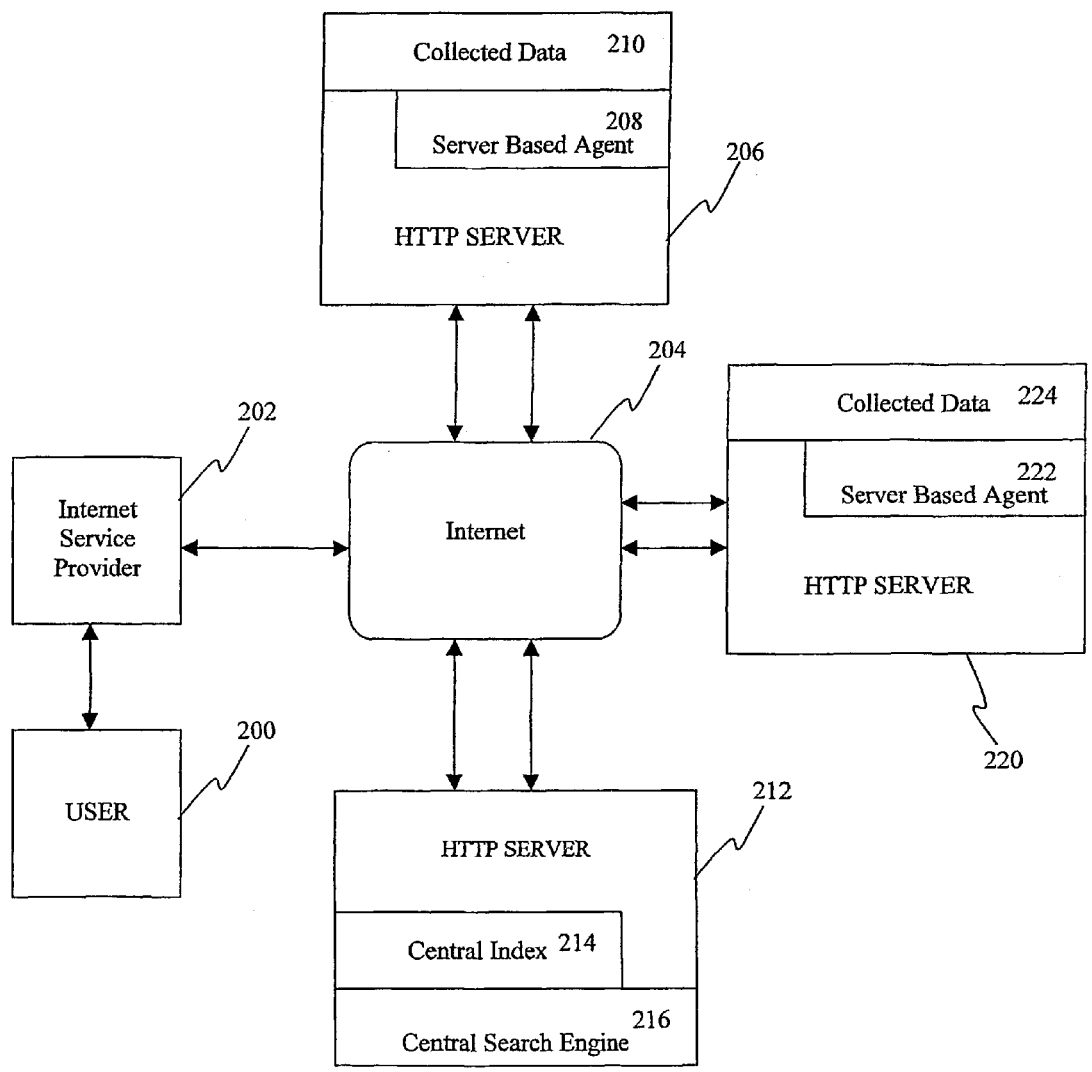
FIG. 2 is a schematic diagram of a preferred embodiment of an indexing system connected to the Internet.

An indexing system for the Internet is described hereinafter that reviews and collates indexing data in a distributed manner, but which centrally stores the indexing data for access by a user, although this central storage can be distributed or mirrored in a standard manner. The indexing system includes a number of server based agents (SBAs) 208, 222 as shown in FIG. 2, that communicate with a central index (CI) 214 that provides the central storage. The system also includes a central search engine (CSE) 216 that uses the central index when processing search requests. An agent 208, 222 can be included with each hypertext transfer protocol (HTTP) server distributed by a server manufacturer. The agent periodically checks for changes made to the data on its local server, such as new sites/pages added, old pages deleted, or old pages modified. The modification noted may include the deletion, creation or modification of a link, a static page or a dynamic page. If there have been any changes, the agent generates an index delta file and reports the relevant indexing changes to a central indexing database of the CI. The central indexing database is a comprehensive and up-to-date indexing database for a search engine available on-line, such as the CSE.

It will be apparent from the following description that the indexing system is able to:

(i) maintain an up-to-date index (ii) create an index that covers most of the Internet (iii) manage and update stale links (iv) index dynamically created pages (v) collect detailed statistical information on individual web sites (vi) create an e-commerce portal with sophisticated comparison shopping capabilities.

Figure 1:
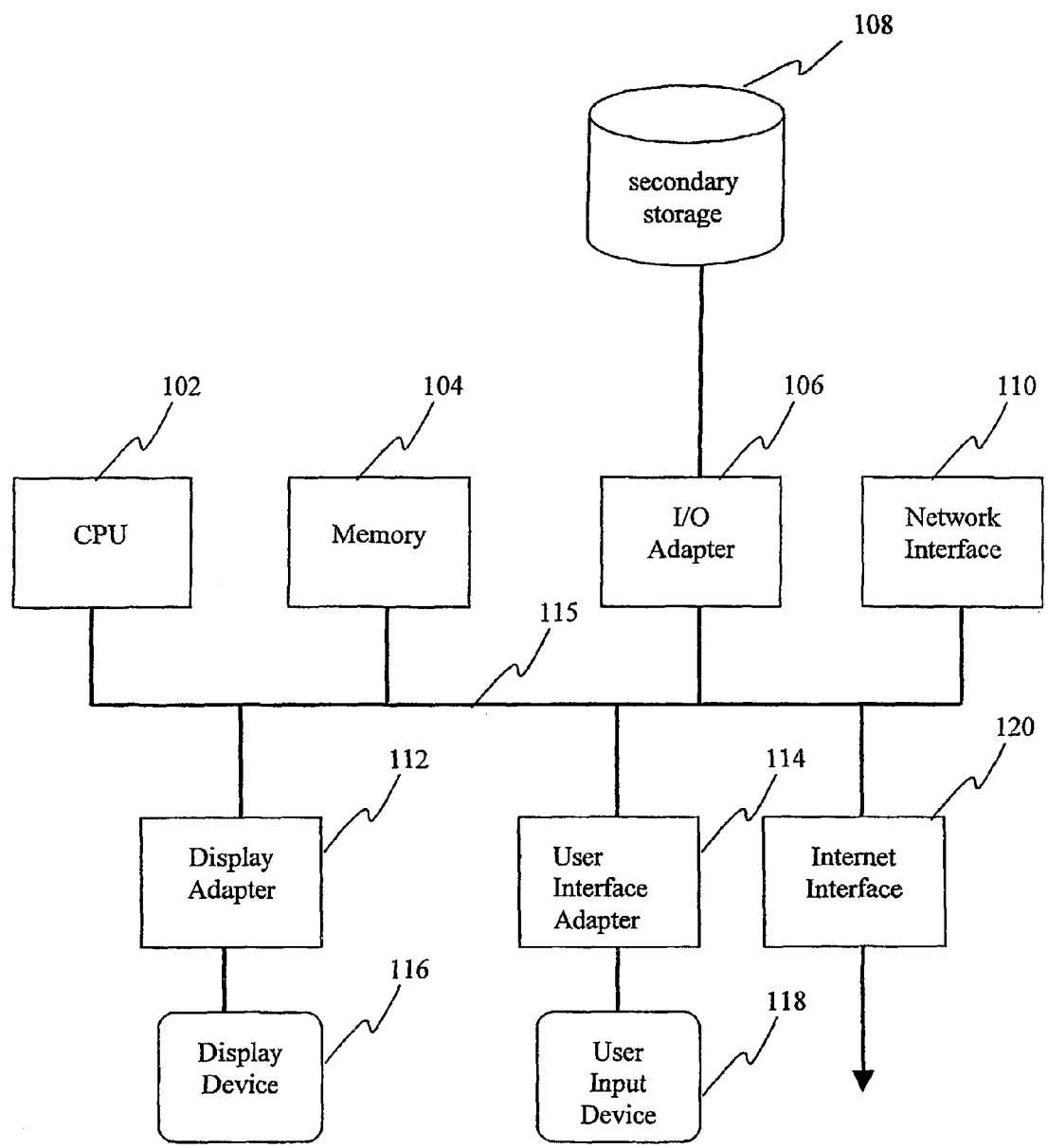
FIG. 1 is a schematic diagram of a computer system suitable for connection to the Internet.

FIG. 1 shows a diagram of a typical computer system 200 suitable for a user to use to retrieve data using the indexing system. The computer 200 may include a system of one or more central processing units (CPUs) 102, a memory system 104, an input/output (I/O) adapter 106, a secondary storage 108, a network interface 110, a user interface adapter 114, and a display adapter 112. All of the computer components are connected by a system bus 115. The display adapter 112 may be connected to a display 116 for displaying a recommendation to a user. The user interface adapter 114 may be connected to a user input device 118. The user may be connected to the Internet through the network interface, 110. The user may also be connected to the Internet through an Internet interface 120, for example a connection through a modem to a service provider such as America Online®, or through a cable connection to an Internet Service Provider.

In FIG. 2, a user 200 is connected to an Internet service provider (ISP) 202, who is coupled to the Internet 204. Also coupled to the Internet 204 is a first server, typically an HTTP Server (HS) 206 that implements and provides access to one or more sites which may contain, for example, html pages and other documents and scripts. The HS server 206 includes a server-based agent (SBA) 208 that carries out data collection activities from documents on the first HS server 206. The SBA 208 may operate at all times, or may run for intervals interspersed with periods of inactivity. The SBA 208 examines all documents located on the HS server 206 to create a listing of all document updates, stored in the collected data block 210. The SBA 208 transmits the listing of document updates in the form of an index file or index delta file to the central index (CI) 214, that can be provided by software executed on an index server 212. An index file is a file of data that provides information on what is contained on various locations on the network, such as what is contained on various web pages, together with addresses for locations of the data. The file may have a complex structure and be distributed over a number of files and/or servers. The reference to an index file may also include a reference to an index delta file, which is a file that simply contains changes that need to be made to an existing index file in view of changes to the data on the network. It will be apparent to those skilled in the art that an efficient implementation of the indexing system is to provide a software implementation of the SBAs and the CI and CSE, as described below, with the CI having the architecture described below with reference to FIG. 13. It will also be apparent to those skilled in the art that a number of the components can be distributed in a communications network, such as the Internet, and also that a number of the software components can be substituted by hardware circuits, such as ASICs, that execute the same processes as the software components.

The CI 214 receives updates from numerous other servers, for example the second server 220, that also has an SBA 222 and a selection of collected data 224, collected from the web pages on the second server 220 by the SBA 222. The CI 214 updates its contents to incorporate the updates received from the various servers, such as the first HS 206 and the second HS 220. The index server 212 may also be provided with the CSE 216. The interface of the search engine 216 may be located at some URL. When requested to perform a search, the search engine 216 may search through the entries of the CI 214 before forming a response. The central search engine (CSE) 216 need not, however, be located on the same server 212 as the CI 214.

The function of the CI 214 may also be applied to a number of regional indexes, which perform a similar function to the CI 214, but for a specified region or for a specified domain. These regional indexes may provide the CI 214 with regional index information so that the CI 214 maintains indexing information for all servers.

1.1 Server-Based Agent (SBA)

The SBA is a program on a server that autonomously searches for data on that server. It can be part of the web server or it can be separate. The SBA is typically reactive to situations encountered, and may run for long periods of time. It is able to send information to the CI that allows the search engines to search both static and dynamic web pages that are available at the web server's site. It is also able to notice when pages are moved or deleted so as to deal with stale links and it can collect web page usage data for each web server, which can be used to improve the ranking of search engine results.

The basic actions carried out by the basic SBA are as follows:

(a) update_local ( )—makes note of changes in the data on the local server, and constructs a local_index file and an index_delta file.

(b) report (CI_address, index_delta)—makes a report to the CI, at address CI_address, transmitting the index_delta file that describes the local changes detected in the update operation.

The SBA 208 performs two basic indexing functions, namely updating its own index and the index_delta file, and reporting the index_delta file to the CI 214. These two basic indexing functions may operate with the same frequency. For example, the SBA 208 may have a timer that prompts the agent 208 into operation at regular intervals, e.g. every 24 hours. While not active, the SBA 208 maintains its index entries for all documents on the server from the previous active period. When the SBA 208 is awoken by its timer, it may check for changes in the directory tree of the server site, or if any individual files have been changed. Any changes that are detected are stored and then reported to the CI 214. Where there are no changes, the SBA 208 may be programmed not to send an index_delta file to the CI 214, so as to preserve bandwidth The SBA 208 also updates its local index files for the documents at that server site.

Instead of updating at regular scheduled intervals, the SBA 208 may update whenever a page on the website is changed. In this case, the SBA 208 may offer to the author of the change (or to the website administrator) to submit the change to the CI 214 immediately. The SBA 208 may also prompt the author, in the same dialogue, to enter, or update, any subject keywords that the author feels reflects the page. These keywords may then be submitted to the CI 214 in the index_delta file. Of course, the author may simply ignore the option to enter keywords.

The time between report operations may be set at a fixed interval, or may be dynamically altered to fit the nature or needs of the local server 206 or the index server 212.

As part of the update operation, the SBA 208 may review hypertext links in the pages on the local server 206. The reviewed links are then compared with a link list formed during the previous update operation to determine whether links have been added or subtracted. The SBA 208 includes the list of changed links in the index_delta file transferred to the CI 214. This information may then be used by the CI 214 to remove references to stale links using one or more of a number of methods described more fully hereinbelow.

The SBA 208 also may be configured to collect statistical information about the local server 206, such as the number of times a page has been accessed by users of the Internet and the time spent at that page, the page that these users came from immediately before visiting the site, bandwidth statistics about the site and what connections were made since the last update operation. Such information may be useful to the website administrator or author to assist with optimising the design and layout of the site. Such information, when collated in a central repository, may provide useful data for identifying where extra infrastructure needs to be added to the Internet, or as supporting information when determining the relevancy ranking of pages in a set of search results.

The SBA is able to index dynamic pages, as described below, which provides an opportunity to create special purpose indexes for specific applications. One example of this is an e-commerce index which forms the basis for an e-commerce portal site which provides information on other e-commerce sites which have an SBA installed.

Another example of a special purpose SBA is an application involving proxy servers.

1.2 Central Index (CI)

The CI 214 acts as a server to corresponding SBAs 208 and 222 in that the SBAs 208 and 222 connect to the CI 214 when they have an index_delta to report. The CI 214 is typically interfaced to the Internet through an HTTP Server 212, or index server.

When the CI 214 receives an index_delta file from a particular server, the CI 214 updates its index database accordingly. The new data in the index database is immediately available to the CSE 216 for use by Internet searchers. There are a number of options for the way in which data may be transferred between a SBA and the CI including:

(i) an SBA sending an index file to the CI based on its own parameter settings
(ii) an SBA sending an index_delta file to the CI based on its own parameter settings
(iii) an SBA sending a short message to the CI indicating that a change has occurred, so that the CI may retrieve the changes later in any manner which it chooses, including but not limited to sending a spider for indexing by existing methods, or for retrieving the index or index_delta file
(iv) an SBA sending a short message or an index or index_delta file to a regional index rather than to the CI The CI 214 may also accumulate statistics relating to the load at local servers, in addition to accumulating indexing data.

The CI 214 may also have a list of construction and modification dates for all Internet documents. This date list may be helpful in searching, and allow a useful facility for obtaining the most up-to-date information on a topic. The CI 214 may also evaluate whether a site is one which is no longer maintained, based on information in the date list.

2.1 Stale Links

The CI maintains in the index database an index for each URL that lists the URLs of pages that include a link to it or reference it. This is a library of URLs that relates each subject URL to other URLs that have a page linking to the subject URL. When index information is reported to the CI indicating that a particular URL has been deleted or moved, the CI may search the URL index to determine which URLs contain links to the deleted URL, and then send notification to the SBA at each of the referring servers. The local SBA may then take some action in response to such notification. For example, the SBA may notify the authors of the referring page, or the website administrator, that the link has been deleted or moved. The SBA may also be programmed to take automatic action. One example of automatic action that the SBA may take in view of a deleted or moved link is to add a warning to the html code of the referring page to indicate that the marked link is no longer valid. Another example is that the SBA may replace the link with a link to the root directory of the site to which the URL had hitherto been referring, if possible. Where the CI is notified that the URL has been moved, rather than deleted, the SBA at the referring site may be configured to update the link to the new URL.

Stale links occur when a link in an existing html document on a server is changed in some way. The change may be that the page referred to in the link, also known as the target page, has been deleted, been moved (for example, its URL changed), or its contents modified. The changes are communicated, so that a user who loads or looks at the referring page is not led, for example, to an empty target page or to a target page that no longer contains the information that the author of the original link was relying on when forming the link.

A common syntax for forming a link in an html document is:

<A href="www.server.com/linkto_doc.html">link phrase</A> where "href" is the html attribute used to create a hyperlink to another document, "www.server.com/linkto_doc html" is the Internet address of the document being linked to, otherwise known as the target document, and "link phrase" is the phrase in the html document that the user clicks on to follow the link to linkto_doc.html. Other attributes may be used to form a link, in addition to the "href" attribute, to another point within the same document.

For stale links that occur within the same website, the SBA may be setup to automatically update these, or alternatively it could inform the website administrator so that they could decide whether to implement the changes manually or automatically by using the SBA.

Figure 3:
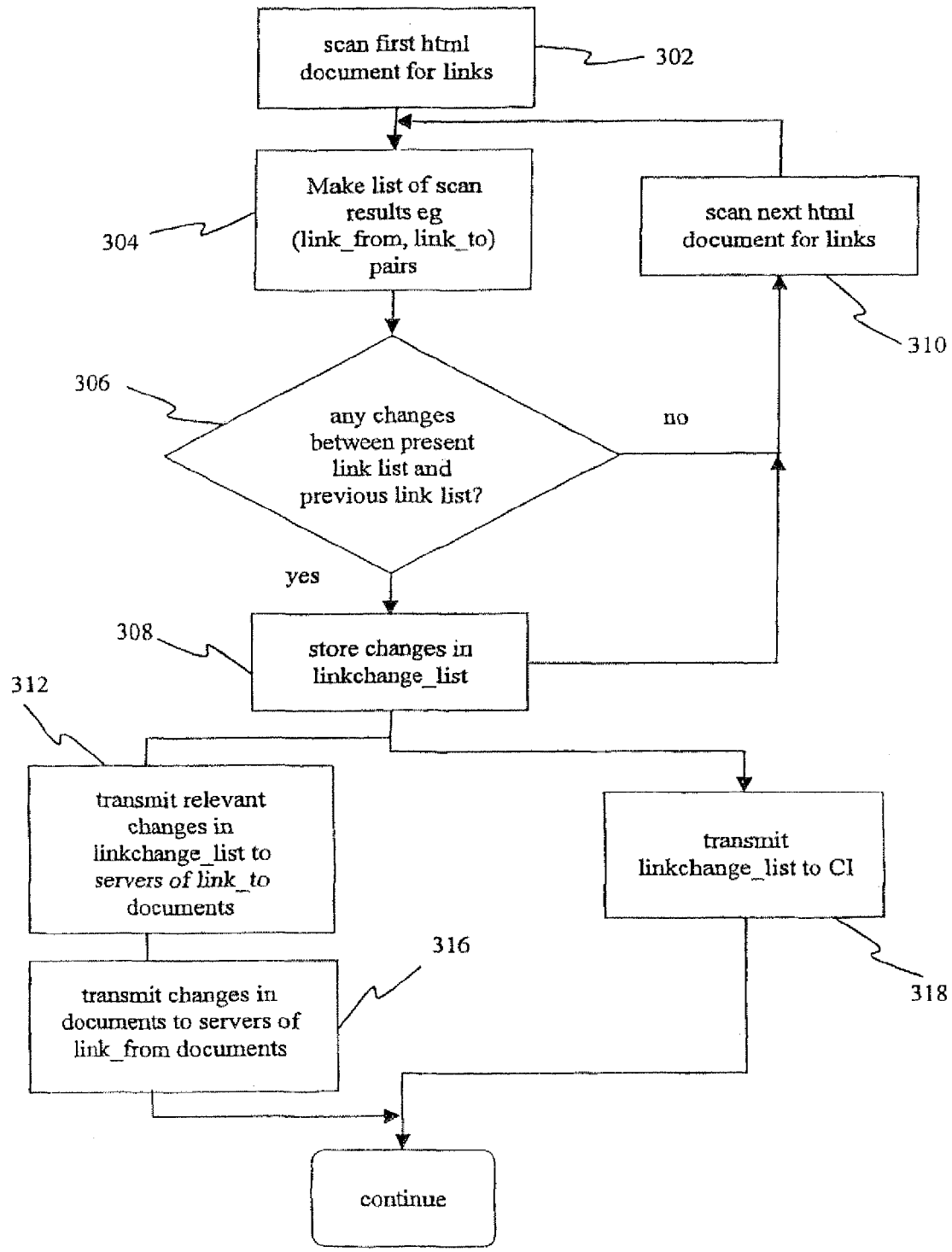
FIG. 3 is a flow diagram of the basic method for handling stale links of the indexing system.

An SBA, as shown in FIG. 3, scans the first html document on the server for links by searching for anchor tags, at step 302. The SBA forms a list of the links found in the document, at step 304. The list may, for example, include a number of tuples in the form (link_from, link_to), where link_from designates the source html document and link_to designates the target html document (i.e. the document to which the link points).

The SBA then identifies changes in links that have occurred since the previous link scan, at step 306. Those link tuples that relate to changed links are then stored in the linkchange_list file, at step 308. The SBA then proceeds to scan the remaining html documents on the server, at step 310, so that linkchange_list contains all changes in links contained in all the documents on the server.

Figure 4:
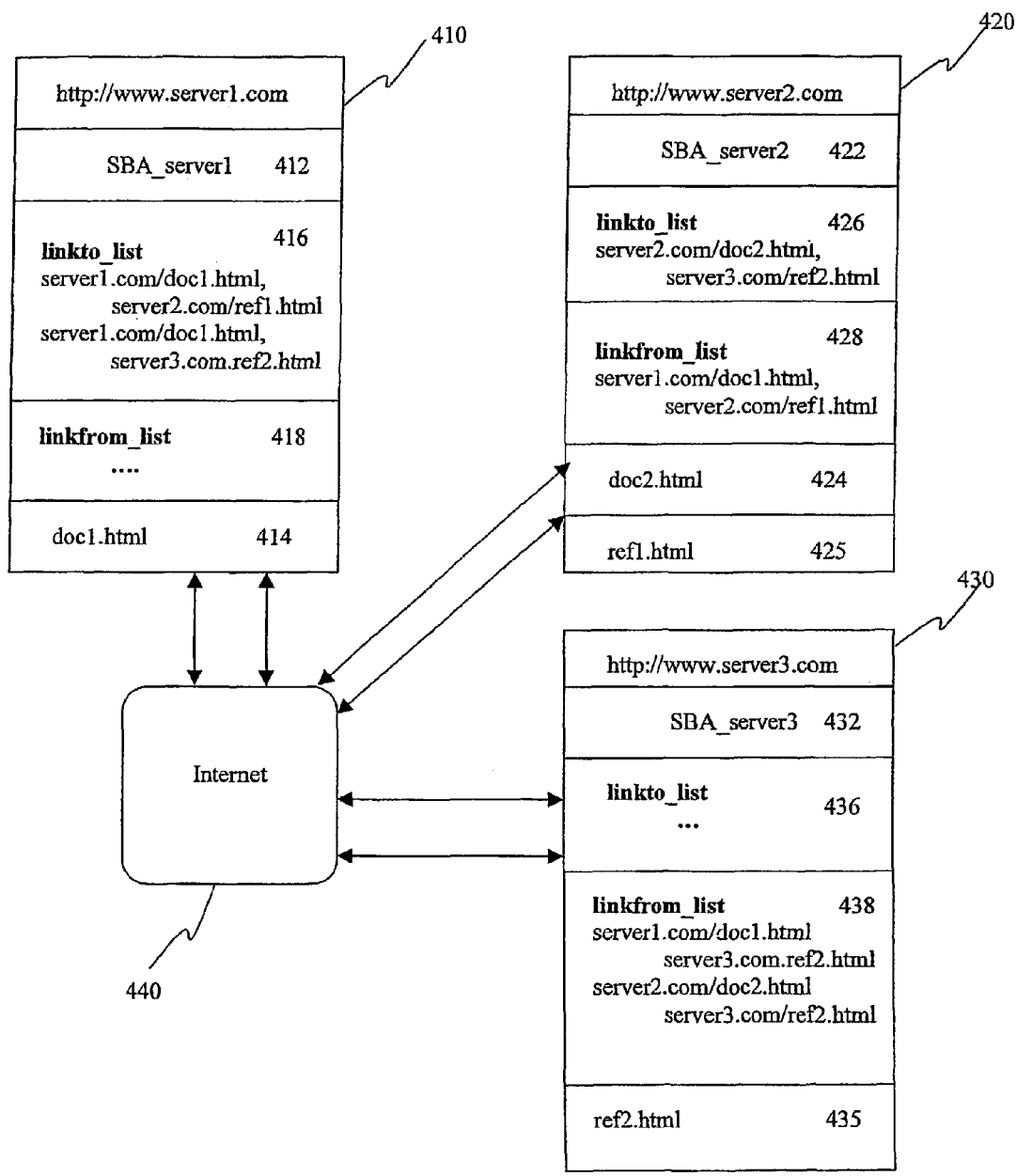
FIG. 4 is a schematic illustrating an example of three web servers with server-based agents of the indexing system connected to the Internet.

The SBA may then proceed along different paths or may proceed along parallel paths. One option for proceeding, at step 312, is for the SBA to transmit to other servers the relevant changes contained in linkchange_list. This approach is illustrated in FIG. 4, which shows three servers 410, 420 and 430 in communication through the Internet 440. The first server 410, having the server name http://www.server_com, has an SBA 412, entitled SBA_server1. An html document 414, entitled doc1.html is present on the first server 410. The second server 420 has the address http://www.server2.com and also has an SBA 422 called SBA_server2. The second server 420 has two html documents, doc2.html 424 and ref1.html 425. The third server 430 has the address http://www.server3.com. The third server 430 has an SBA 432 called SBA_server3. The third server 430 has an html document 435 entitled ref2.html.

The html document doc1.html 414 on the first server 410 includes a number of links, including a link to ref1.html 425 on the second server 420 and ref2.html 435 on the third server 430. The SBAs on each server, as described above at step 304, create a list of tuples of source and target documents. Therefore, the linkto_list file 416 created by the first SBA 412 includes at least the two tuples illustrated, i.e., (www.server1.com,/doc1.html, www.server2.com/ref1.html) and
(www.server1com,/doc1.html, www.server3.com/ref2.html).

Likewise, the second server 420 also contains a linkto_list file 426 that lists tuples of source and target documents, where the source documents are html documents on the second server 420 and the target documents are documents referred to by links in the source documents and that are stored on other servers. In the illustrated example, doc2.html 424 includes a link to ref2.html 435 on the third server. Accordingly, the linkto_list file 426 includes the tuple (www.server2.com/doc2.html, www.server3.com/ref2.html). The servers 410, 420 and 430 may contain additional documents that have links to documents on other servers.

Referring back to FIG. 3, at step 312 the SBA 412 transmits relevant changes in linkchange$_{13}$ list to the servers where the target documents are located. For example, any changes in the links from doc1.html are reported to the relevant server containing a target document. Thus if doc1.html is changed to include a link to ref2.html, then this new link is included in linkchange_list, and this tuple is transmitted to server 420. Server 420 receives the information from server 410 and assembles a second list, linkfrom_list 428, from the information received from the first server 410 and other servers. The linkfrom_list file 428 is a list of documents contained on the second server 420 that are linked to by other documents.

In a similar manner, ref2.html, on the third server 430, is linked to by two different documents, doc1.html 414 on the first server 410, and doc2.html 424 on the second server 420. The third server 430 receives information from both the first and second servers 410 and 420 that ref2.html is linked to by doc1.html and doc2.html, and that information is assembled in the linkfrom_list 438.

Under this protocol, each SBA assembles a inkto_list file that indicates for all links the source file and the target file, where the source is contained on that server. The SBA also assembles linkfrom_list from information received from other servers that indicates which documents on other servers have links connecting to the documents contained on that server. Each SBA periodically scans the documents contained on its server for links and identifies changes in links, as illustrated in the steps shown in FIG. 3. This may occur, for example, every 24 hours or once a week, or at some other regular time interval selected by the server administrator according to the expected frequency of modifications made to the html pages stored on the server. This ensures that each SBA can assemble a linkfrom_list file that is reasonably up-to-date.

The SBA then, at step 316, may transmit changes that have been detected in target html documents on that server, to those servers that contain the source html documents, i.e., those documents that include links to the current server. This permits servers of source, or link_to, documents to adapt the links in the source documents according to the changes in the target document. This is explained further below.

Another protocol for maintaining updated links, and avoiding stale links, includes the step 318 of transmitting the changes in the links to the CI. The CI maintains a list of all links between documents and informs source documents of changes in a target document when changes in the target document are received.

Figure 5:
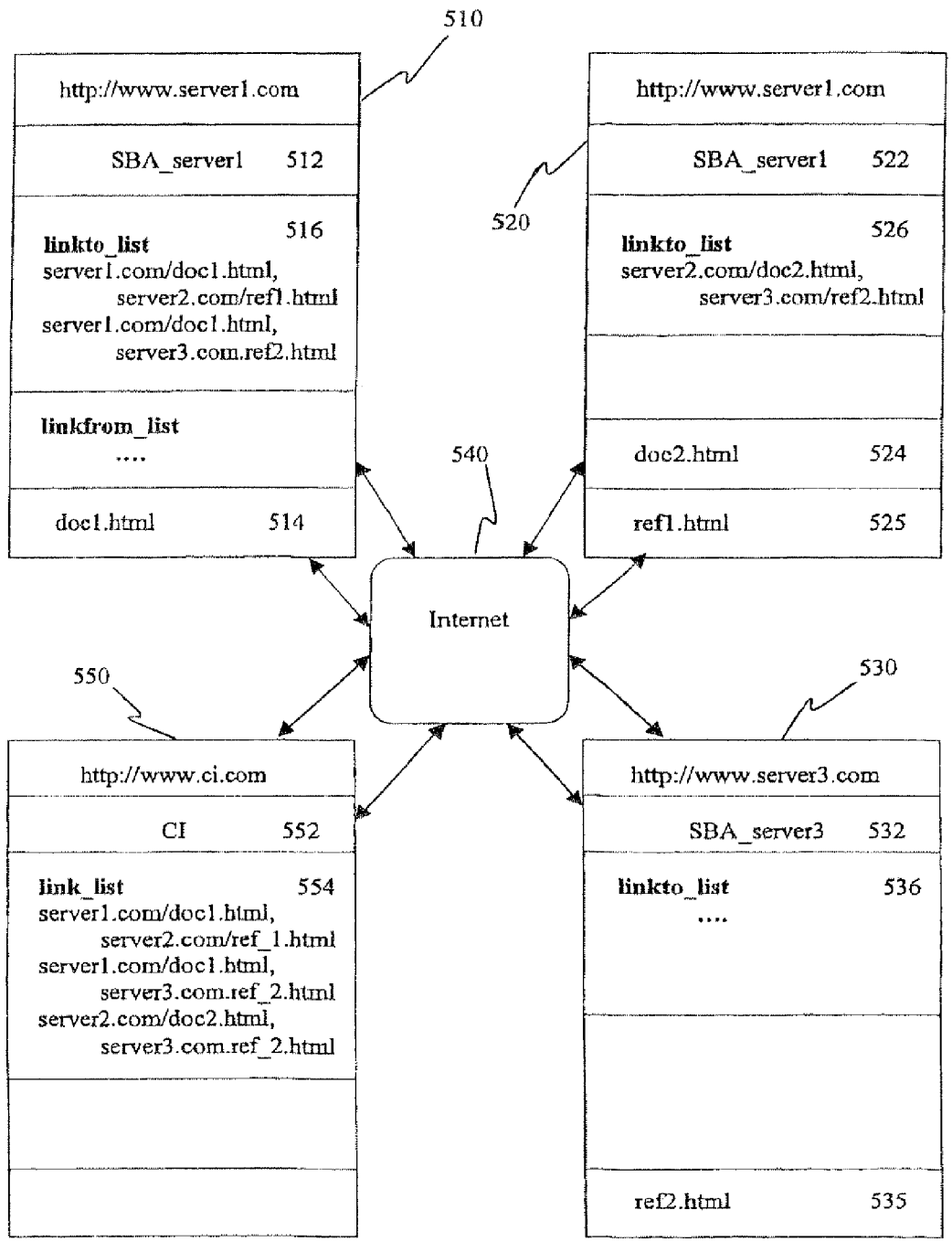
FIG. 5 is a schematic illustrating an example of three web servers with server-based agents and a central index of the indexing system.

This is explained further with reference to FIG. 5, which illustrates first, second and third HTTP servers 510, 520 and 530 that contain html documents, and are connected via the Internet 540. The first server 510 includes an SBA 512 called SBA_server1, and the second and third servers, 520 and 530 also include respective SBAs 522 and 532. Each SBA assembles a linkto_list file 516, 526 and 536 in a manner according to step 304. The first, second and third servers 510, 520 and 530 are connected to a central index server 550, whose address is, for example, http://www.ci.com. The CI server 550 includes the CI 552. The CI contains indexing information received from the attached servers in a manner as described above.

The first SBA 512 transmits changes in links to the CI, at step 318. The CI 552 maintains a link_list 554 that is a listing of all links between documents. Therefore, since doc1.html 514 on the first server 510 includes links to ref1.html and ref2.html, link_list includes the tuple (www.server1.com/doc1.html, www.server2.com/ref1.html) and the tuple (www.server1.com/doc1.html, www.server3.com/ref2.html). Additionally, doc2.html 524 on the second server 520 includes a link to ref2.html 535 on the third server 530. Therefore, the file link_list 554 also includes the tuple (server2.com/doc2.html, server3.com/ref2.html). Since the CI 552 includes all link information, there is no requirement in this protocol to maintain a linkfrom_list file at each server.

Figure 6A:
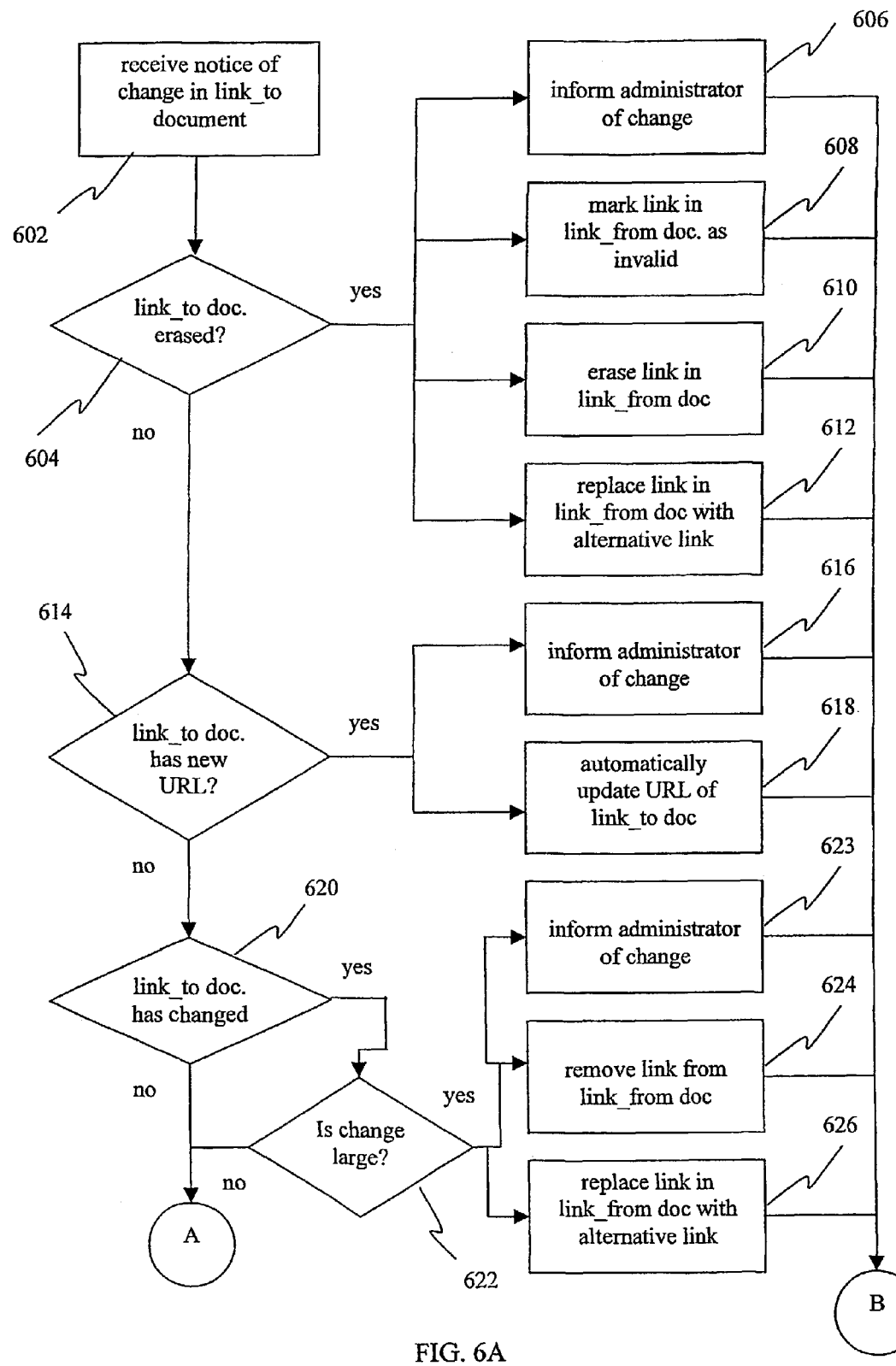
FIG. 6 is a flow diagram of the response of a server-based agent to receiving information that a document linked to one on another web sever has changed.
Figure 6B:
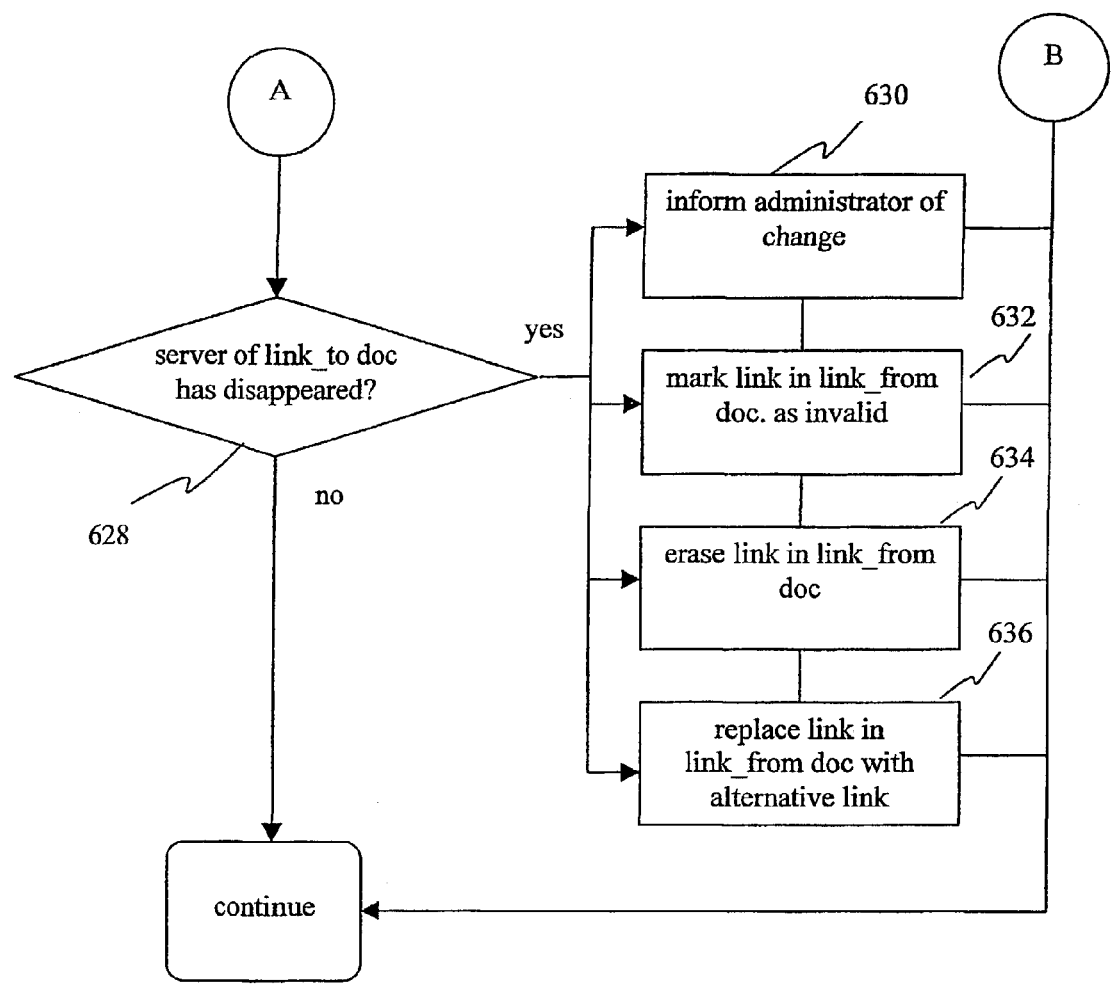

FIG. 6 shows the process executed by an SBA in response to receiving information that a target document on another server has been changed. The local SBA, at step 602, receives notice of the change in the target (link_to) document, together with an indication of the type of change. The SBA then determines whether the target document has been deleted.

Upon determining that the target document has been deleted or otherwise removed, the SBA may take one or more of the following actions. First, the SBA may transmit a message to the server administrator, at step 606, notifying the administrator of the change of the target document. The administrator may also be informed as to which source document or documents on the server contain a link to the target document in question. If authorized or configured to do so, the SBA may automatically amend the source document, for example, by inserting a mark in the source document to indicate that the link is invalid, in step 608. Additionally, the SBA may be authorized or configured to remove the link from the source document, at step 610. Furthermore, the SBA may be authorized or configured to replace the link to the current subject document with a new link to an alternative target document, at step 612.

One possible way of determining an alternative document would be to find one with the same words and with similar word frequencies for these words. The CI could do a search for all documents that have the 10 most frequent words from the deleted document. Of these set of documents, it can look for those which have the closest relative word frequencies to those of the deleted document. This will involve looking in the forward index, which shows the frequencies for words in the documents.

When the SBA determines that the URL of the target document has been changed, step 614, then the SBA may provide a notice to the server administrator of the change in URL, step 616. The SBA may also be authorized or configured to amend the URL of the target document in the anchor tag of the source document, at step 618.

If the SBA determines that the target document has not been deleted, nor been moved, the SBA then determines whether the contents of the target document have changed, at step 620.

One way to determine if the contents of the page have changed significantly is to check whether the title of the page has changed significantly. This involves comparing two small pieces of text. If substrings of the previous title remain, then the page has probably not significantly changed. If all the words are different, and there are no semantic links between the old and new words (a semantic dictionary such as wordNet can be used) then it can be concluded that the content has significantly changed.

Once the SBA has determined that the change in the contents of the target document is sufficiently important, at step 622, the SBA may then proceed in one or more different ways. For example, the SBA may simply inform the server administrator, at step 623, of the change in the contents of the target page. The administrator may then inform the author of the source page so that the author may make a manual determination as to whether the target page is still worthy of maintaining the link from the source page. The SBA may also be authorized or configured to remove the link in the source document, at step 624 or may be authorized to replace the link to the target document with a new link to an alternative target document, at step 626.

The method of choosing an alternative document is the same as for above case where a document has been deleted.

The SBA may also determine that the server on which the target document is located is no longer available, at step 628. If so, then the SBA may take one or more of the following steps. The SBA may inform the server administrator that the server containing the target document is no longer available, at step 630. The SBA may, if authorized or configured to do so, amend the source document, at step 632 with a mark indicating that the target document is no longer available. The SBA may also, if authorized or configured to do so, simply erase the link in the source document, at step 634. Also, the SBA may replace the link in the source document, at step 636 with a new link to an alternative target document.

Figure 7:
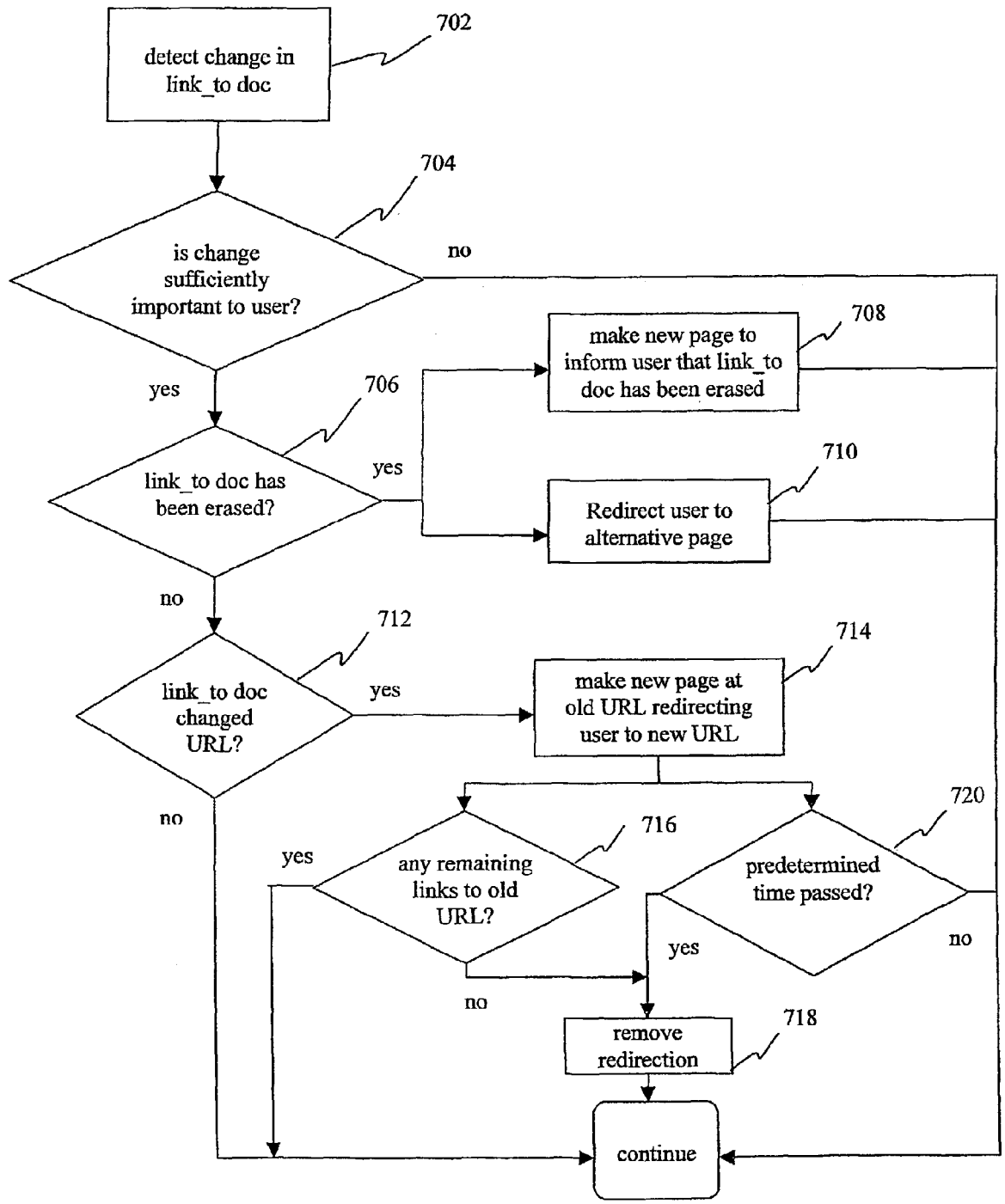
FIG. 7 is a flow diagram of a server-based agent notifying a web author that a document linked to on another web server has changed or moved.

The SBA of the server of a target document may also take steps to warn a user that the target document has changed or moved, as illustrated in FIG. 7. Once the SBA has detected that there is a change in an html document to which source documents on other servers have links, step 702, the SBA then determines whether the change in the target document is sufficiently important that a user should be warned of the change, in step 704.

If the SBA determines that a user should be notified of the change to the document, the SBA then determines whether the document has been removed, at step 706. If the target document has been removed, then the SBA may be authorized or configured to form a new html document that informs a user that a target document has been deleted, in step 708, or may make a new html document that notifies a user of an alternative page to view instead of the target page that had been deleted, at step 710.

If the SBA determines that the URL of the target document has been changed, at step 712, the SBA may then make a new page at the old URL that notifies the user of the new URL, at step 714. This new page may even include a hypertext link to the target document at the new URL.

The SBA may be configured to post the new page for a limited time. The length of time for which the new page is displayed may be set according to whether there remain any further links to the old URL. The SBA maintains a current link_from list indicating which source documents link to the old URL. Once it is determined that there remain no more links to the old URL, at step 716, then the new redirecting page may be removed, at step 718. In addition, the SBA may be programmed to remove the new page of the old URL after a predetermined length of time has passed, for example, six months, at step 720.

Figure 8:
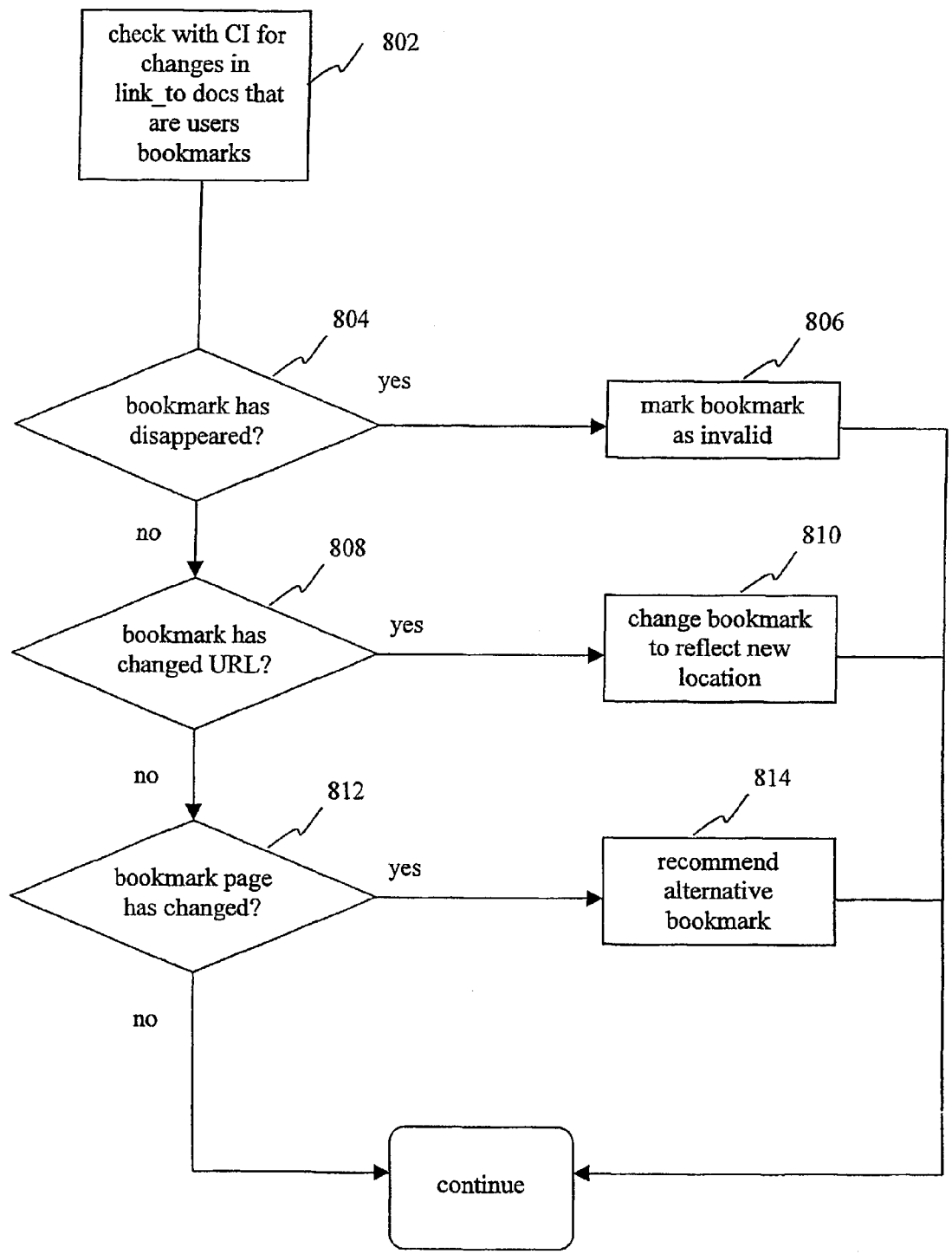
FIG. 8 is a flow diagram of how a web browser may check with the central index to update changes to it's bookmarks.

To ensure that a user's browser does not contain bookmarks that direct the user to sites that have changed or changed or are no longer available, reference can be had to the database maintained by the central index. The browser can be provided with an agent that periodically checks with the central index to ensure that the bookmarked pages are still available, at step 802 in FIG. 8. If the browser agent determines, at step 804, that the bookmark has disappeared, the browser agent may mark the bookmark as being invalid, step 806. If the browser agent determines from the central index that a bookmark has changed its URL, at step 808, then the browser agent may be configured to change the bookmark to reflect a new URL, at step 810. If the browser agent determines, at step 812, that the contents of the page located at the bookmark have been changed, the browser agent may recommend to the user an alternative bookmark, at step 814.

2.2 Dynamic Pages and Generated Static Pages

Dynamic pages are web pages that are not written by hand in html, typically the html that constitutes them is made by a program "dynamically". These pages are constructed by a program at the time at which, for example, an html form query is submitted by a user. Most dynamic pages use data from a database in their construction. Other kinds of dynamic pages (eg charts) are constructed by Java or Javascript programs or scripts. A dynamic page can be considered to be a web page that is generated by a program or script each time its URL is requested by a browser, and it is not stored on the web server. Most dynamic pages are generated from a backend database. Some pages may be generated in advance from a database and stored as static pages, and references to dynamic pages should usually be taken to include generated or pre-generated static pages. An input tuple is used to send inputs that results in the return of a valid dynamic page.

Some sites with information in databases do not create dynamic pages on request, but use a script to generate a large number of static pages which are updated periodically. These pages have similar characteristics to dynamic pages, in that in general there are unlikely to be links to them from anywhere else. Hence, conventional indexing methods such as spidering may not find these pages, because spiders find web pages via links. These generated static pages may be caches of frequently accessed dynamic pages rather than comprehensive sets of all possible pages. A generated static page or pre-generated static page can be considered to be a web page that is stored as a static page to speed access to information in a database (eg by generating all or a subset of the possible pages, or by caching dynamic pages as they are retrieved). These may be captured in the same way as any other static page, but may be more efficiently indexed by recognizing the connections with a dynamic page or database, and references to dynamic pages should usually be taken to include generated or pre-generated static pages. Indexing of dynamic pages and these generated static pages is described below.

As will be apparent from the detailed description below, the generation of pre-generated static pages is similar to a method (Case 2.3 described below) by which an SBA generates and indexes dynamic pages, but does not store them, while the generated static page sites generate the pages and store them as static pages for fast access. Therefore, the generated static pages could be indexed by the SBA like any other static page, however, a tuple representation is the most compact way for a SBA to represent all these created pages, and the scripts that generate these pages can be used by the SBA when indexing. Hence, these static pages are handled by a dynamic page tuple indexing method (Case 2.1 described below) except that static links are generated on the search results page by the CSE rather than dynamic links.

A html form is a construct in html that allows a viewer of a web page to submit information to the web site that they are currently accessing. For example, when using a search engine such as Lycos, the user submits one or more keywords by typing them into a portion of the screen currently being viewed, and then initiates transfer of the keywords by clicking on a button on the screen such as "search". The keywords are then received at the web site currently being accessed.

Figure 10:
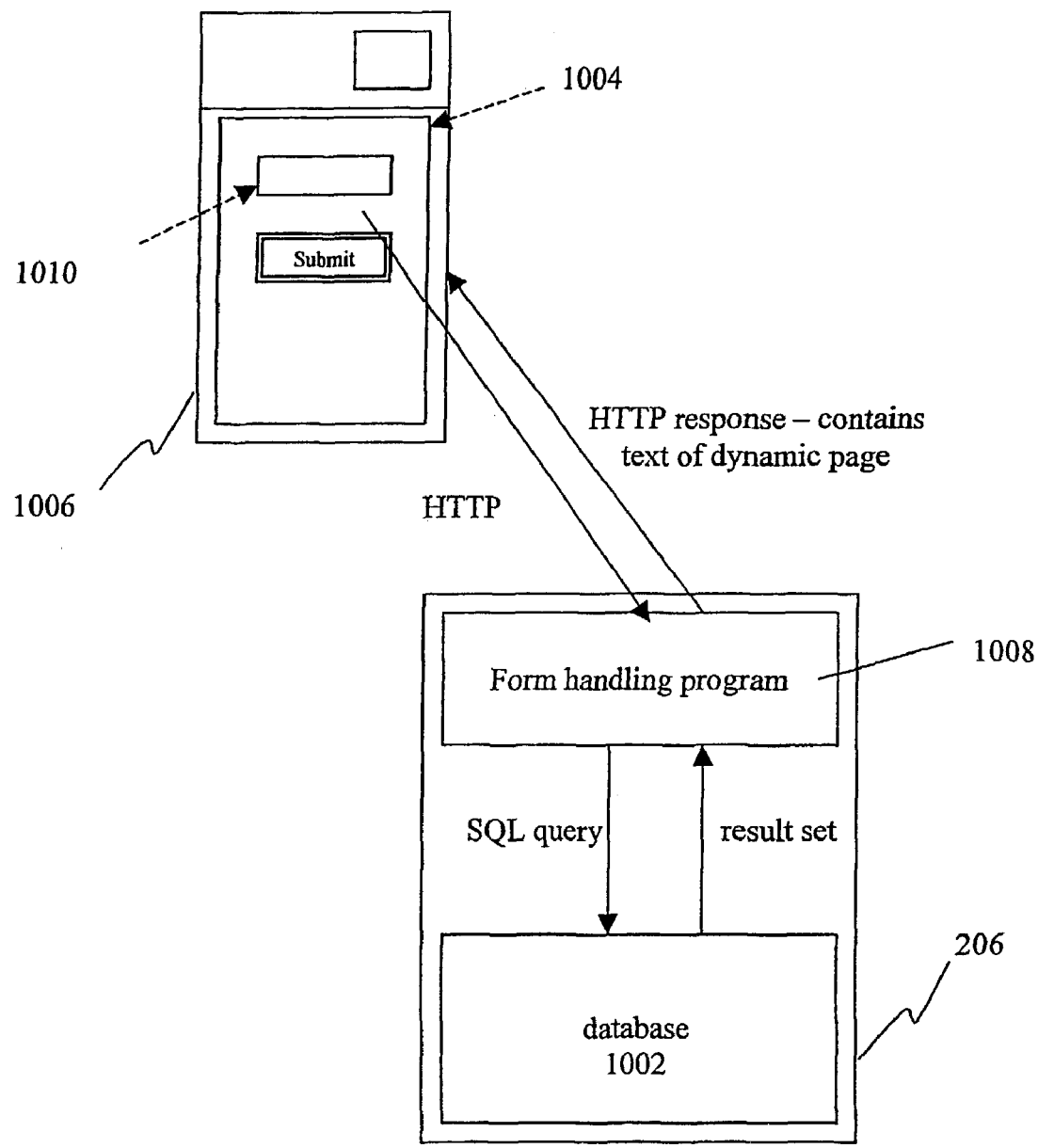
FIG. 10 is a schematic illustrating how a dynamic page is created by entering data into a form page.
Figure 11:
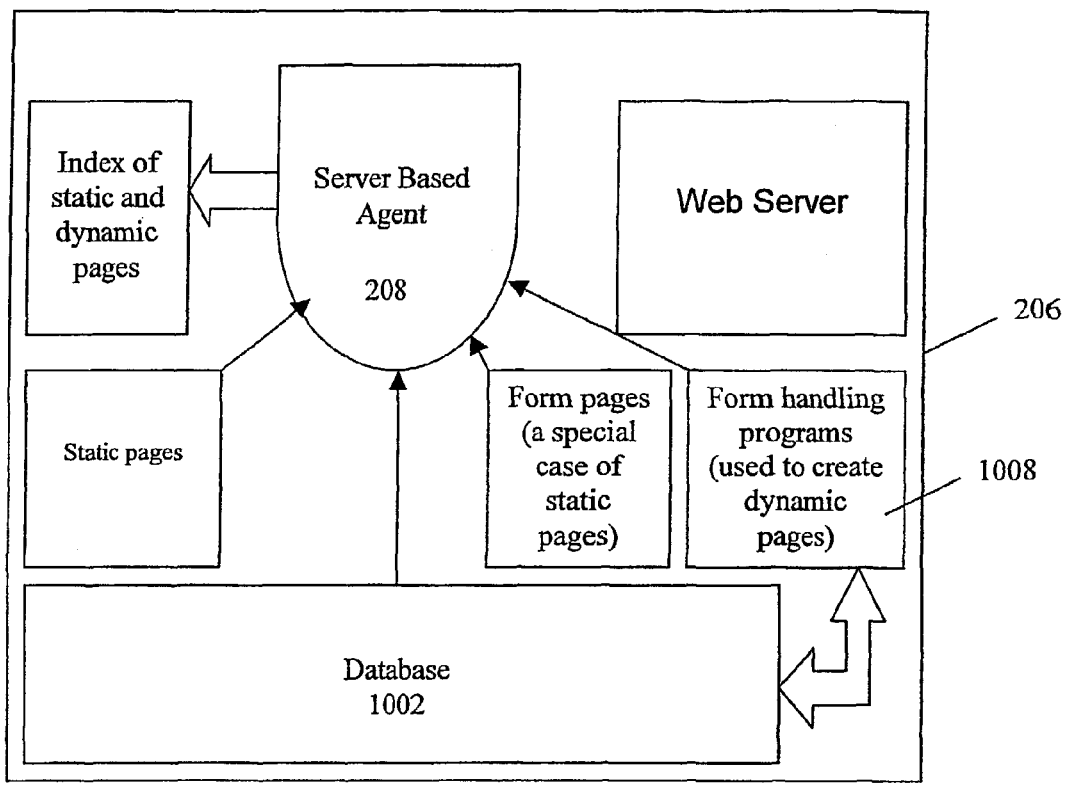
FIG. 11 is a schematic illustrating a web server with a server-based agent, static pages, and a database and from handling programs which create dynamic pages on request.

The html form construct names a program that handles the words or inputs submitted by the user. This is the program that creates the dynamic page. Such a program in many cases would be a cgi script (cgi means "common gateway interface"). The cgi script receives the information sent by the user, and interprets the information as a request for a piece of information from a local or remote database and generates a query, such as an SQL query, to the database. The cgi script then retrieves the requested data from the database, builds a page using this data and returns the dynamic page to the user. There are programs other than cgi scripts used to create dynamic pages, and any reference to a form handling program herein should be interpreted to mean any script or executable file of any kind or in any language, whether interpreted or compiled to machine code or intermediate or virtual machine code (including Java servlets and Remote Methods) that can be used to generate a dynamic page. A form page can be considered to be a web page that contains fields, menus and/or other means for a user to specify inputs, and is most often a static page, although the term also includes dynamic pages that contain fields to allow the user to initiate a new search, and other means of collecting inputs such as Java windows. An example illustrating how form pages are used to generate dynamic pages is described below with reference to FIGS. 9 to 10, when illustrating how the SBA operates on a server 206 as shown in FIG. 11.

Figure 12:
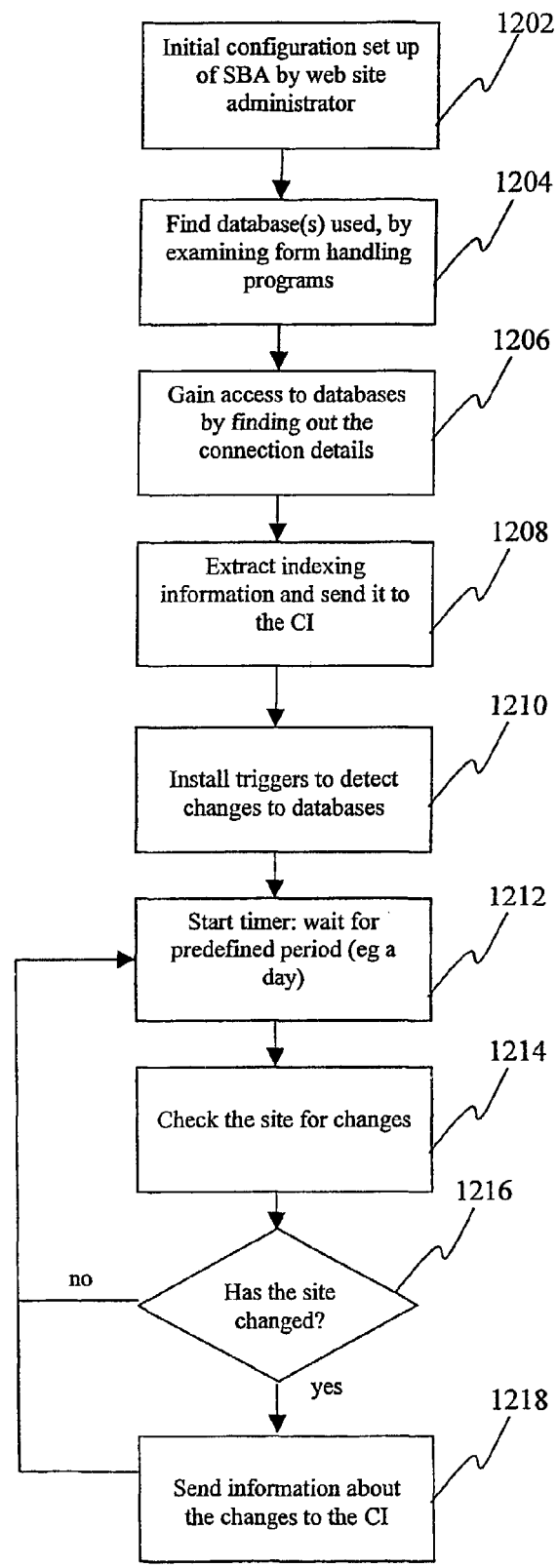
FIG. 12 is a flow diagram of a server-based agent process for indexing dynamic pages.

2.2.1 Overview of Indexing of Dynamic and Generated Static Pages 2.2.1.1 Operation of the SBA The general steps executed by an SBA to index dynamic pages is shown in FIG. 12. During installation, the SBA may be configured to suit the needs of the web site administrator, at step 1202. For example, the SBA may be configured with a number of parameters, including:
(i) how often the SBA checks the website for changes
(ii) automatic updating of stale links, or alerts only to the website administrator with suggested updates
(iii) restrictions on pages which are not to be indexed
(iv) restrictions on data (eg a column) in any database(s) which is not to be indexed (eg confidential information, information that is not important or not useful, or information that is only to be displayed if other information is provided by a user—an example of this last point is where a user may enter a person's name, and the phone number will be returned, and this is not to occur the other way around.
(v) option for the SBA to automatically update indexing information when changes are made to a database which has been set to be indexed ('database triggers')

Once configured, the SBA scrutinizes the local website and finds the database(s) used in the generation of dynamic pages, at step 1204. The SBA then determines further information about each database such as the type, query language used, username and password, and access methods (this information may either be provided manually by the website administrator, or determined automatically by the SBA), so that the SBA is able to connect and retrieve data from each database, at step 1206. The SBA then extracts indexing information from the relevant database(s), using one of the methods described below, and this information, which may be in a compressed format, is sent to the CI, using one of the methods described below, at step 1208. If configured to do so, the SBA installs triggers which automatically detect when a change is made to a database that is being indexed, at step 1210. The SBA then waits for a predefined period (at step 1212) which may be set during the installation process or thereafter, before checking the website for any changes that may have occurred, at step 1214. If the site has changed (step 1216), the SBA sends the relevant index information to the CI, at step 1218.

2.2.1.2 Operation of the CI

Figure 13:
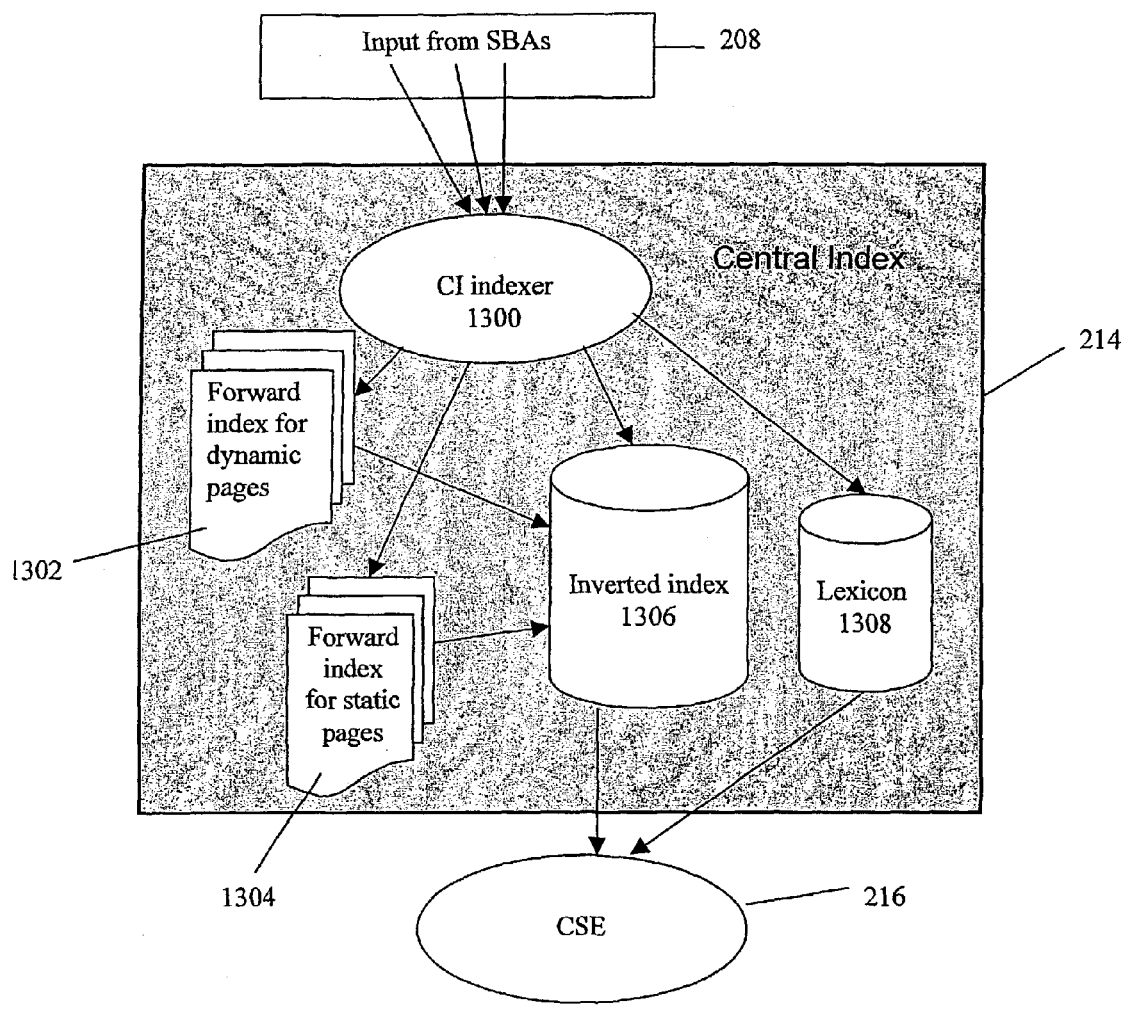
FIG. 13 is a block diagram of the central index.

FIG. 13 shows the structure of the CI 214 and its relationship to the CSE 216. When indexing information is received from the many SBAs, the CI indexer 1300 first constructs forward index entries 1302 and 1304 for this information. It then makes use of the information in the forward index entries to update the inverted index 1306. The forward index entries for static pages 1304 may then be deleted, unless the SBA and CI are going to communicate with deltas, ie index delta files, in which case those forward index entries should remain. Deleting them will significantly reduce the storage at the CI required for static pages. The forward index entries for the dynamic pages 1302 can generally not be deleted. It should be noted that there are a number of alternative approaches to the way in which the forward and inverted indexes may be structured, including one in which the inverted index shares tables from the forward index. A lexicon 1308 of query terms is maintained that can comprise a dictionary and/or thesaurus of indexed terms of the inverted index 1306. It will be apparent to those skilled in the art, that the functions of the lexicon 1308 could be integrated into the inverted index 1306.

The lexicon 1308 provides word, or term, to wordID mapping, the inverted index 1306 provides wordID to docID mapping, and the forward index 1302, 1304 provides docID to URL mapping. When a searcher provides one or more query terms for which to search, the lexicon 1308 is consulted to determine whether or not the terms exist in the index, and if they do, their corresponding wordID. The inverted index is then searched to find all docIDs for the wordIDs, representing the complete set of documents that contain the searcher's query terms.

Information stored in the inverted index 1306 may include:
(i) whether the docID corresponds to a static or dynamic page;
(ii) whether the query terms are found in an important field (such as a title) or the body of the text;
(iii) whether the query terms are closely located (and hence possibly related) within a given document, or apparently unrelated; and
(iv) whether the document contains all, or only some, of the query terms.

This information is used to order the list of docIDs such that those documents most likely to be relevant to the user's query are at the head of the list. Then for each docID, the forward index is consulted to determine the URL through which the original document can be retrieved. In the case of a dynamic page, this involves reconstructing the URL from the form handling program URL, method, input fields and input tuple. The forward index content may also be used to confirm the presence of exact phrases that the searcher may have specified, and to provide short extracts of the relevant content that the searcher may review when considering which results to pursue.

Figure 14:
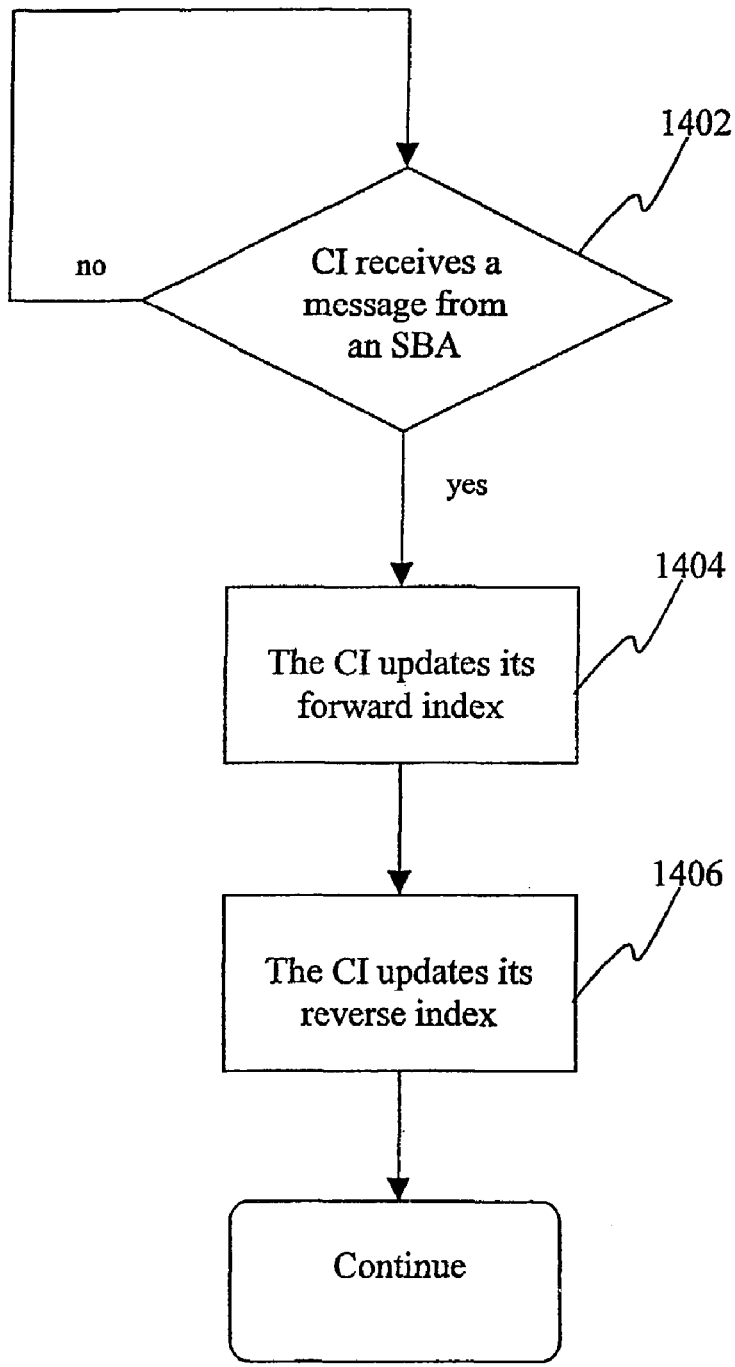
FIG. 14 is a flow diagram of a process executed by the central index.

With reference to FIG. 14, the CI waits to receive a message from an SBA at step 1402. When the CI receives a message, it then adds new indexing information and modifies existing indexing information in its forward index 1302, 1304, at step 1404. The CI then adds new indexing information and modifies existing indexing information in its reverse index 1306, at step 1406. The CI then waits for further messages from SBAs.

2.2.1.3 Operation of the CSE

Figure 15B:
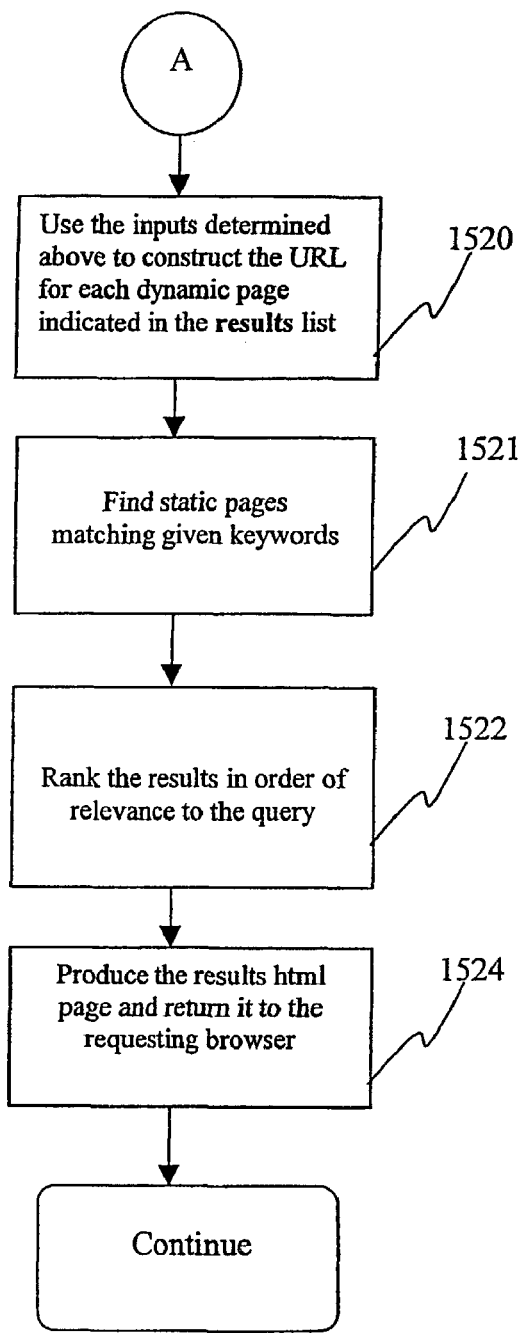
FIG. 15 is a flow diagram of a process executed by a central search engine of the indexing system for dynamic page indexing.
Figure 16A:
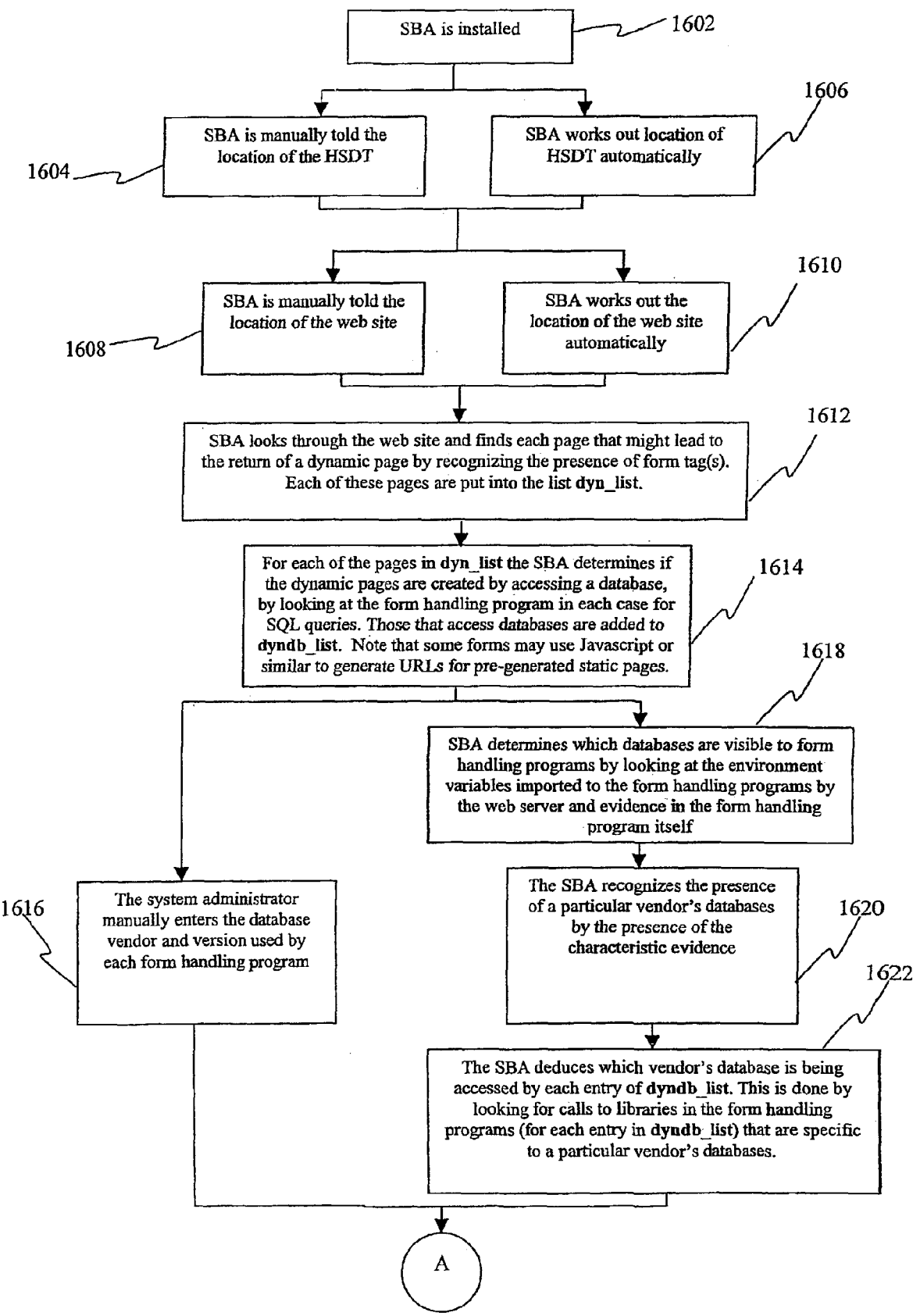
FIG. 16 is a flow diagram of a process executed by server-based agents for dynamic page indexing.
Figure 16B:
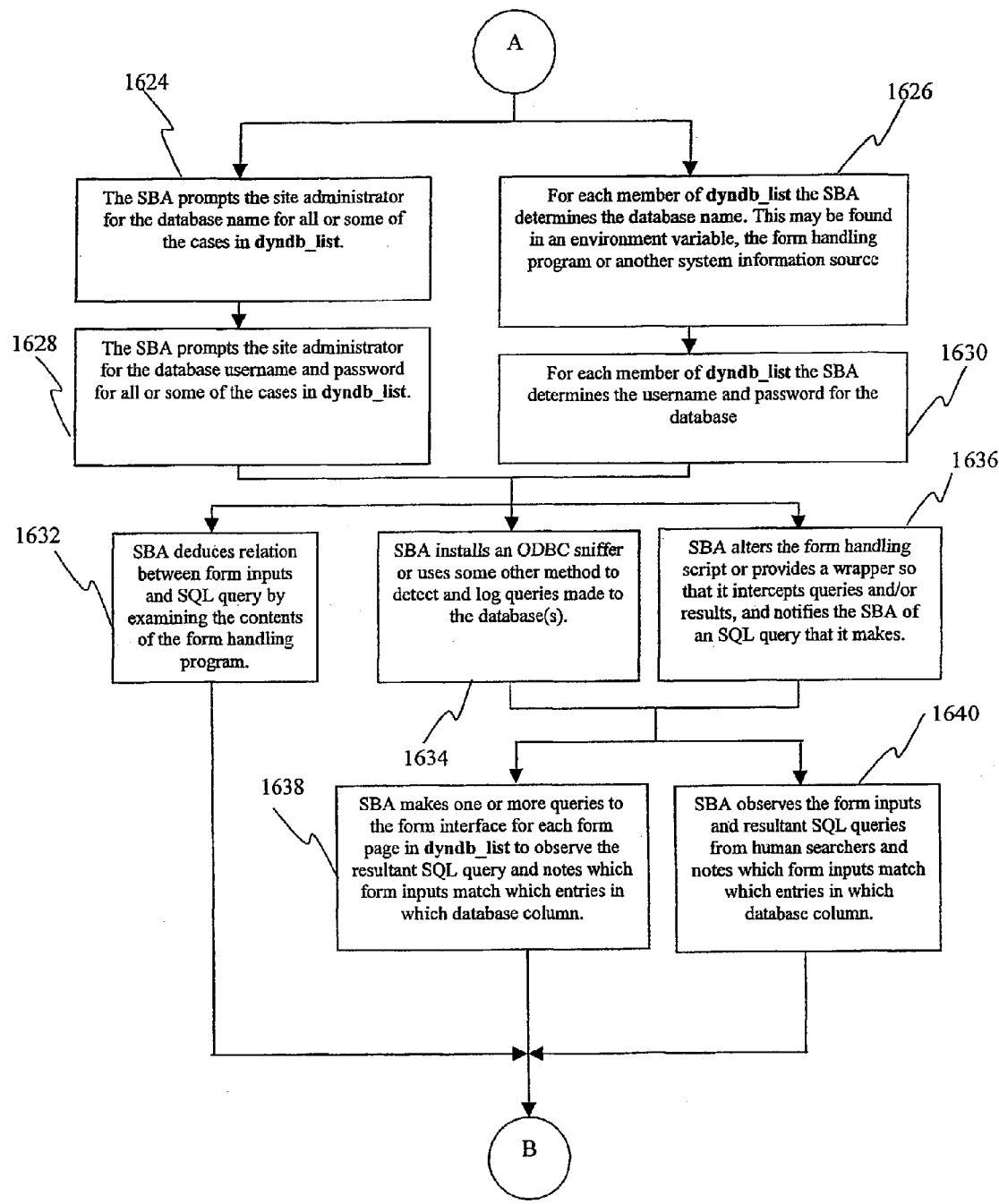
Figure 16C:
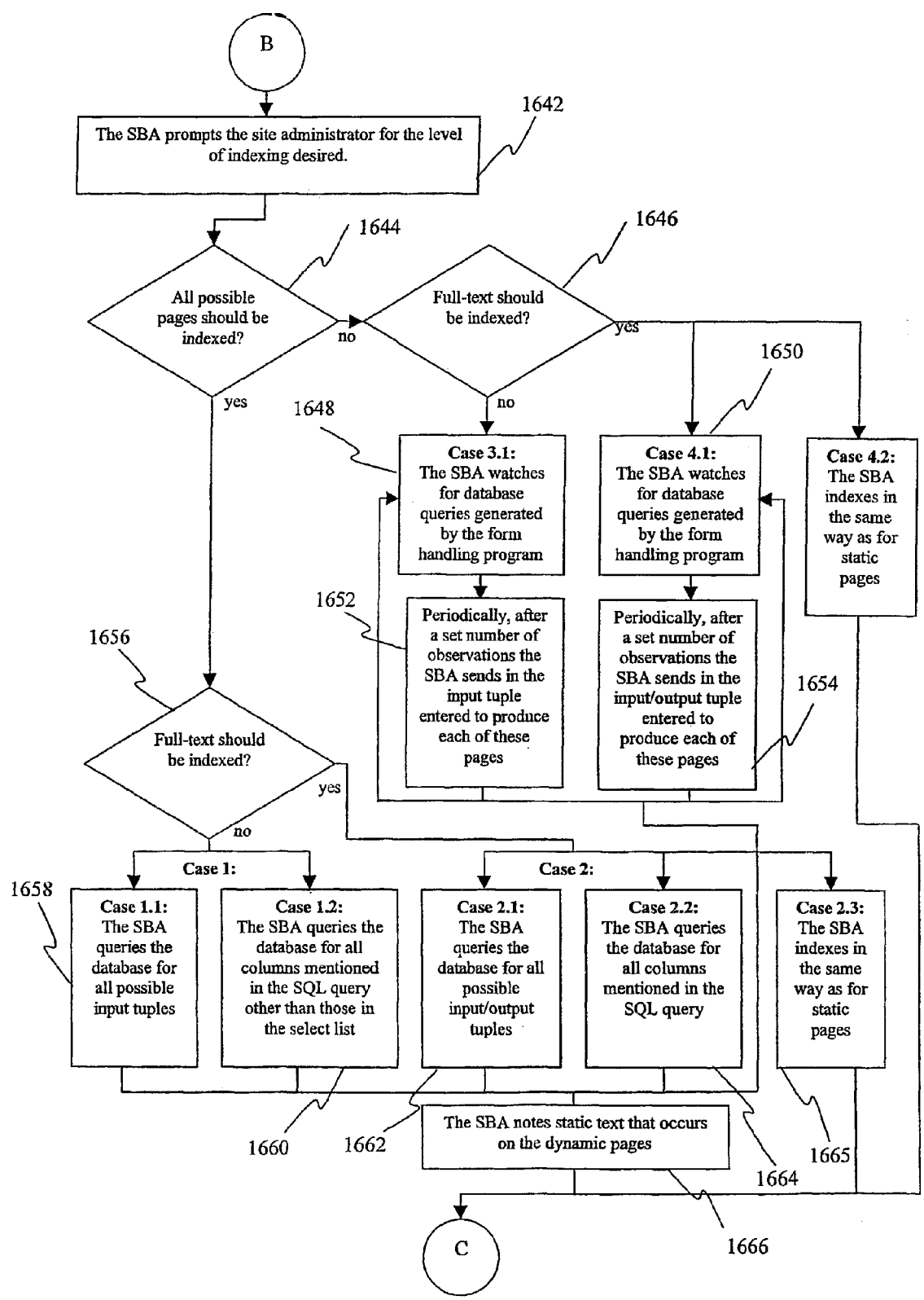
Figure 16D:
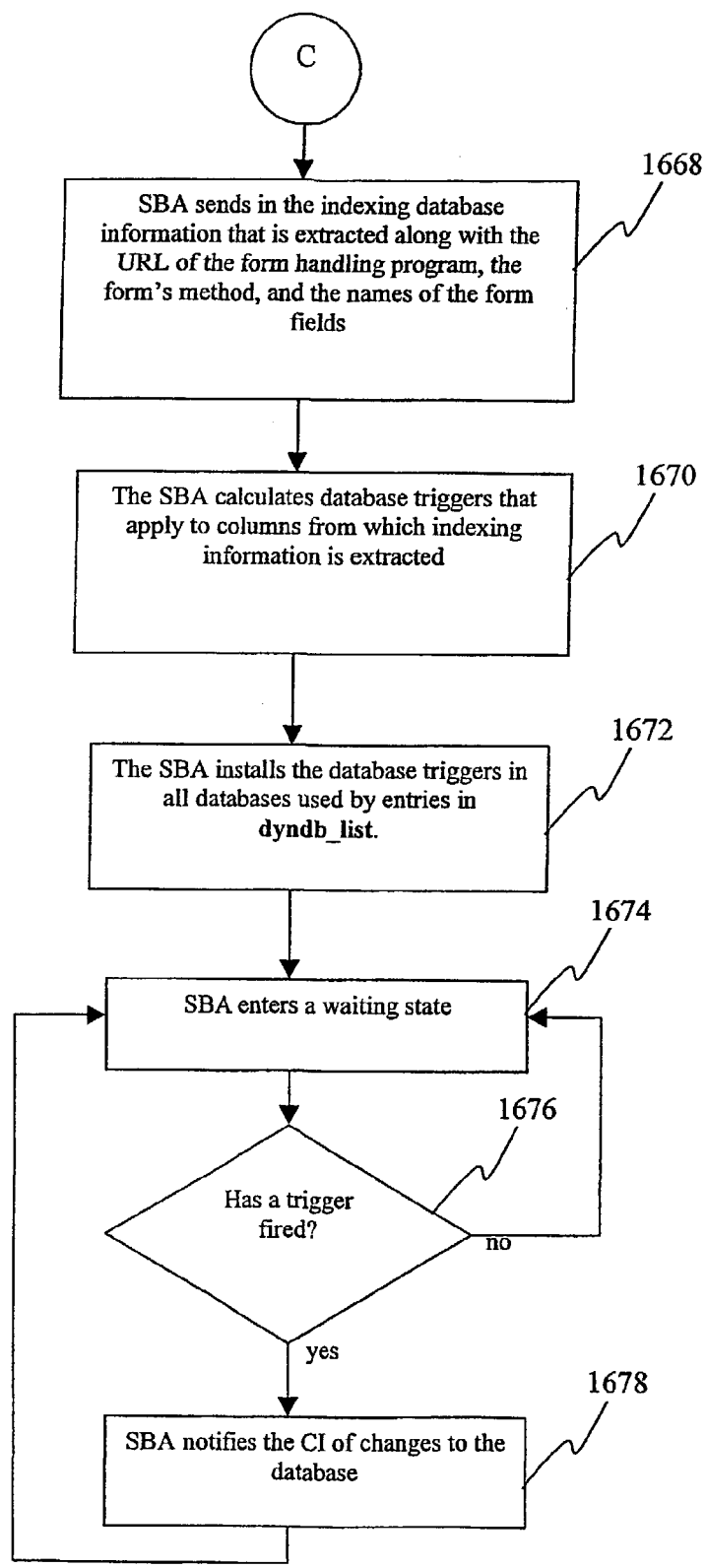

With reference to FIG. 15, the CSE waits for a user to request information on a search topic, at step 1502. The CSE receives a query by a user entering appropriate search information (eg keywords) through a browser and hitting a.submit or search button on the search engine web page, at step 1504. The CSE examines the CI's inverted index 1306 to form a list of dynamic pages creation points that match each keyword, at step 1506. The CSE then merges the lists for the keywords to find dynamic page creation points that match all query words, resulting in a pre-results list, at step 1508. The items in the pre-results list are checked to see if there is a valid dynamic page containing this information, at steps 1510 and 1512. If not, the item is removed from the list (at step 1514) and the next item is checked. If there is a valid dynamic page containing this information, the inputs that produce this page are noted and placed in a results list, and the entry is removed from the pre-results list, at step 1516. Each item is checked in the pre-results list (if any are left, the CSE goes back to step 1510), until none are left, at step 1518. Using the inputs determined at step 1516, the URL is constructed for each dynamic page in the results list, at step 1520. The set of static pages that contain the given keywords is determined at step 1521. The associated URLs are added to the results list to form a combined results list for static and dynamic pages. The results are then ranked in order of relevance to the query, at step 1522 (there are standard techniques for doing this). The CSE then produces an html results page and returns it to the requesting browser, at step 1524. Typically, this results page will contain links to both dynamic and static pages, based on the keywords entered by the user. If the user of the CSE clicks on a link to a dynamic page, they go directly to the dynamic page that is formed from the database information based on the URL that has been constructed by the CSE.

2.2.2 Indexing of Dynamic Pages
2.2.2.1 Stockadvice Example

Figure 9A:
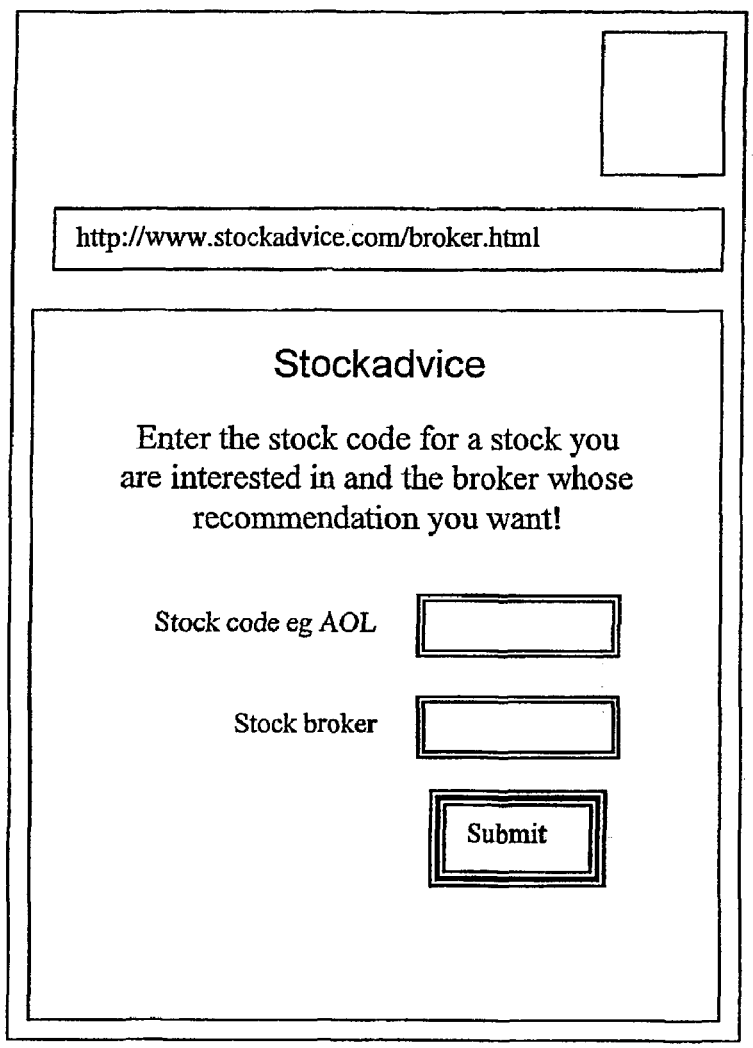
FIG. 9A is an example of a web page with a form input for entry of a stock code and stockbroker's name.
Figure 9B:
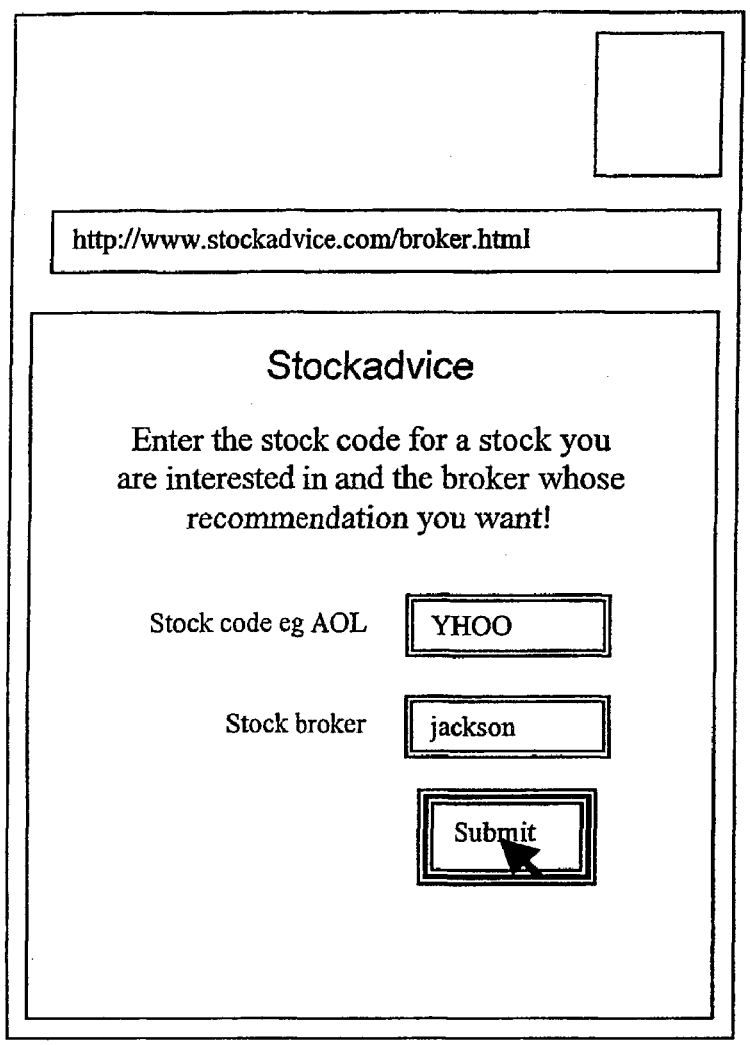
FIG. 9B is the same example as FIG. 9A with entries made in the form input fields.
Figure 9C:
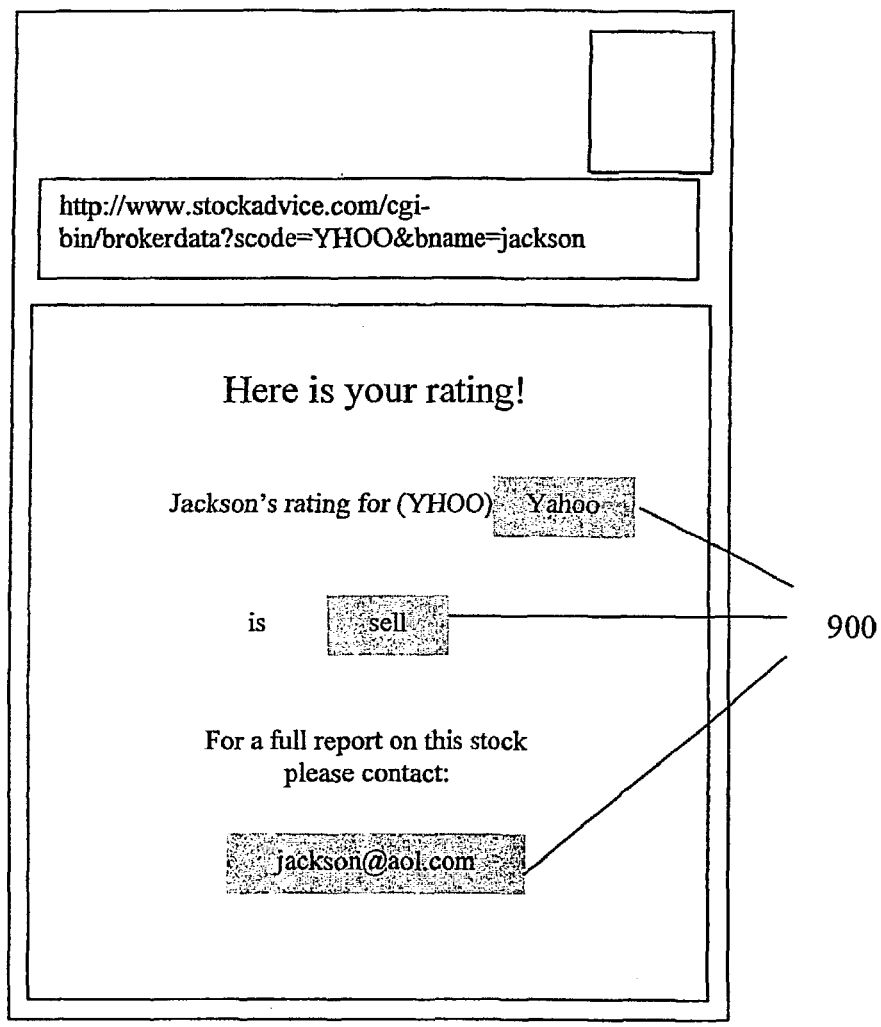
FIG. 9C shows the web page that is returned when the submit button in FIG. 9B is pressed.

The indexing of dynamic pages is described below with reference to a stockadvice example whereby dynamic pages can be generated, as shown in FIGS. 9A to 9C, in order to provide recommendations from stockbrokers on companies listed on various stock exchanges. The form page is shown in FIG. 9A, and the form page with a query entered by the inclusion of specific inputs is shown in FIG. 9B. The resulting dynamic page is then generated and sent to a user's browser as shown in FIG. 9C with the highlighted entries 900 representing the data extracted from the database 1002 of a web server 206, as shown in FIG. 10. FIG. 10 illustrates the message flow whereby the form page 1004 sent to a user's browser 1006 can be used to return a http request to a form handling program 1008 that receives, with the request, data entered in input fields 1010 of the page 1004. The program 1008 generates an SQL query to the relational database 1002 in order to return a result to the program 1008 that can then be used to generate a http response back to the user's browser. The response includes the code defining the dynamic page generated by the program 1008, and the response causes display of the dynamic page, as shown, in FIG. 9C on the user's browser.

More specifically, the URL for the form page of FIG. 9A is:
http://www.stockadvice.com/broker.html One input field is for a stock code and the other input field is for the name of a broker. The name of the form input for stock code is 'scode', and the name of the form input for broker name is 'bname'.

An example of a HTML form tag on broker.html could be:
<FORM ACTION="http://www.stockadvice.com/cgi-bin/brokerdata"METHOD="GET">
Stock code eg AOL<INPUT TYPE="text" NAME="scode" SIZE=1><br>
Stock broker<INPUT TYPE="text" NAME="bname" SIZE=10><br>
<INPUT TYPE="submit" VALUE="Submit"><br>

An example URL for the form handling program is:
http://www.stockadvice.com/cgi-bin/brokerdata In this example, information is stored in an Oracle™ database 1002.

The dynamic page that is created contains the broker's rating for the stock—buy, sell etc. The example table that contains these ratings is as follows:

Stock_Rating Table

| STOCK_CODE | NAME | RATING |
|---|---|---|
| AOL | smith | hold |
| AOL | jackson | buy |
| AOL | andrews | buy |
| MSFT | smith | hold |
| MSFT | jackson | hold |
| YHOO | jackson | sell |
| YHOO | andrews | sell |
| CNN | andrews | hold |

Another table is called stock_info. It is also indexed by stock_code. It has two other columns, exchange, the stock exchange the company is listed at, and the other, stock_name, that contains the name of the company.

Stock_Info Table

| STOCK_CODE | EXCHANGE | STOCK_NAME |
|---|---|---|
| AOL | NY | America Online |
| MSFT | NASDAQ | Microsoft Corp |
| YHOO | NASDAQ | Yahoo |
| CNN | NY | CNN |

A third table, stock_brokers, has the columns name (the primary key), phone_no and email.

Stock_Brokers Table

| NAME | PHONE_NO | EMAIL |
|---|---|---|
| smith | 712349876 | smith@aol.com |
| jackson | 598765432 | jackson@aol.com |
| andrews | 124683579 | andrews@aol.com |

The cgi-script of the program 1008 generates the following SQL query, when a user enters 'YHOO' and 'jackson' into the respective from fields, and then hits the submit button:
select rating, stock_name, email
from stock_info, stock_rating, stock_brokers
where
   stock_info.stock_code='AOL' and
   stock_brokers.name='jackson' and
   stock_info.stock_code=stock_rating.stock_code and
stock_brokers.name=stock_rating.name;

The cgi-script displays on the dynamic page the rating of a particular stock from a particular broker and also the stock's name and the email address of the broker (refer to FIG. 9C).

2.2.2.2 The Server Based Agent

Many of the details given for the SBA in this section are under the assumption that the backend data source is an SQL database. The basic technique with some alterations will also be applicable to the indexing of dynamic pages that are created from backend databases that use query languages other than SQL, and to other backend data sources. As mentioned previously, the SBA may be implemented as a stand-alone software module or may be included in the HTTP Server (HS), or may be included in some other larger software module.

For many commercially available databases, the connection to the database does not need to be from the same computer that hosts the database (DB) 1008. This means that the DB can be on a different computer to the server 206 that stores the HTTP Server Directory Tree (HSDT).

The SBA can be installed on the same computer as the HSDT, or on a computer that allows viewing of all files that are part of the HSDT. This could be done via the computer hosting the SBA and the computer hosting the HSDT, being part of a common network file system. There are also other possible ways for the SBA on a remote machine to view the HSDT hosted on another computer.

With reference to FIG. 16, when the SBA is installed (at step 1602), it may be notified of the location of the HSDT manually by a computer administrator (at step 1604), or it can automatically deduce this location (at step 1606). The latter option, which is not the preferred method, requires the SBA to search the entire network file system, or the local file system, for the HSDT. One way of accomplishing this is by locating html files.

The SBA also needs to determine the location of the Web Site (WS) (ie the actual files that can be served to browsers). This may be provided manually by a computer administrator at step 1608, or the SBA can automatically deduce this at step 1610. One way of accomplishing this is for the SBA to look through the HSDT to find a sub-tree of this which contains html files.

The SBA then looks at each page in the WS to determine if it can possibly be used for making dynamic pages, at step 1612. The SBA makes a list, dyn_list of those pages that could make a dynamic page. One way of determining this is by identifying the presence of an html form in the page. In our Stockadvice example, the SBA would look at the file "broker.html" and would recognize that it has a form tag in it. It would then add this file to dyn_list.

The SBA then creates a new list called dyndb_list, at step 1614. The list dyndb_list generally will contain the same number or less items than dyn_list, because dyndb_list only contains a list of those pages that can create dynamic pages via accessing a database. For pages in dyn_list, the SBA looks at the file that is named as the form action file, act_file. If act_file is a binary (compiled to native machine code or some form of interpreted byte code, eg for the Java Virtual Machine), then the SBA extracts a list of strings, str_list, out of it. A string is a sequence of bytes found in a binary that correspond to values that represent characters such as letters, digits and punctuation. So str_list will typically be a list of readable words and names or terms. If act_file is not a binary, then the strings are readily visible. The SBA then looks through the members of str_list to find a string that is an SQL statement. In particular the SBA will be looking for an SQL select statement. An SQL select statement is used for querying a database. These pages whose act_files contain an SQL select statement will be assumed to be those that access a database to construct dynamic pages. These pages will be recorded in dyndb_list, and the names of their action files stored in dbact_list. In the Stockadvice example, act_file is cgi-bin/brokerdata. As this form handling program contains an SQL select statement, the file broker.html will also be in dyndb_list.

At this point the SBA has determined which pages and their associated form handling programs make dynamic pages by accessing a database. For each page in dyndb_list, the database's name, its username, its password, and its network address must also be identified. The database type accessed by each page in dyndb_list may be supplied manually by the system administrator of the web-site, at step 1616. Alternatively, the SBA may automatically deduce these parameters at steps 1618 through 1622.

The database type and other database access parameters may be automatically deduced by collecting evidence from the set of environment variables made visible to the cgi scripts, and from the content of the scripts themselves, at step 1618. Environment variables are named values from outside a program that the running program can check the value of. There are at least two ways of determining the environment variables visible to the cgi scripts. A non-cross HS approach is to determine for each particular type of HS, where in the HSDT, is the list of environment variables that the HS imports to the environment of its cgi scripts. For example, with the Apache HTTP Server this occurs in the conf/httpd.conf file in its HTTP Server Directory Tree. The other cross-server method for determining the environment variables visible to the cgi scripts is for the SBA to temporarily install a simple script in the WS, that simply lists the environment variables. The SBA then executes an HTTP GET request on this installed script which shows the values and names of all the environment variables.

Once all the environment variables that are visible to the HS's cgi-scripts are known, at step 1620 the SBA looks through them for known standard environment variables of the database types that it knows about, which are stored in a list knowndb_list. For example, if an Oracle database is being used, then environment variables such as ORACLE_BASE, ORACLE_HOME and ORACLE_SID will be present. In the Stockadvice example, these are the environment variables that will be detected because cgi-bin/brokerdata accesses an Oracle database. This check will be made for all databases in the SBA's knowndb_list. This list may include environment variables used by many different types of databases, to ensure that the vast majority of websites may be covered.

The SBA deduces which vendor's database is being accessed by each entry of dyndb_list, at step 1622. Usually only one database will be visible to cgi-scripts at the WS, but not necessarily. If there is only one database, then it is known that each page in dyndb_list accesses it. If there is more than one database, then the SBA determines which pages from dyndb_list access which database. To determine this the SBA uses heuristics for how certain cgi scripts connect to particular databases. For example, if a cgi script is compiled C, and it accesses an Oracle database, then one of the strings extracted from the cgi script will contain the library name, "sqlca". Once the match from cgi script to database is made, the SBA can proceed to identify the database name, the username and password for the database, and its network address if that is required.

The SBA now determines the name of the database and the username and password for the database, if these are required. At steps 1624 and 1628 this may be performed manually by the site administrator entering these details. Alternatively, the SBA can automatically determine these at steps 1626 and 1630. The database name is generally included in an environment variable for the database being accessed, or may be found in the cgi-script itself, or in some other system information source. For example, with Oracle, if the ORACLE_SID environment variable is set, it will contain the database name. If not, it is likely to be at the end of the username string. The SBA uses heuristics for each combination of database type and cgi-script type to look for the database name. For the Stockadvice example the database name will be found in ORACLE_SID, since cgi-bin/brokerdata accesses an Oracle database.

The SBA uses similar heuristics to look for the username and password for the database, at step 1630. These will also be in environment variables, in the script itself, or in some system information source. The SBA uses heuristics for each combination of database type and cgi-script type. For the Stockadvice example the username and password are contained in the text of the form handling program cgi-bin/brokerdata, and the SBA would identify which strings in the program are most likely to be a username and password, and it would then try them to confirm that they were correct.

Now the database type, database name, username and password are known for a cgi-script the SBA can make a connection to the database. If the SBA is implemented in the programming language Java, this could conveniently be done with JDBC. JDBC is a library of pre-written code (API) that provides a uniform SQL interface to many different types of database.

Considering the Stockadvice example, the database that contains the stock information is an Oracle database called stock_db with username "admin" and password "boggle". Also the remote database management system (RDBMS) for the database is running on a host server achilles.stockadvice.com, listening at port 1500. In this case, example Java code to make a connection to this database could be:

Class.forName ("oracle.jdbc.driver.OracleDriver").newInstance( );
    String url="jdbc:oracle:thin:@achilles.stockadvice.com: 1500: stock_db";
Connection con=DriverManager.getConnection(url, "admin", "boggle");

The SBA now determines the relationship between form input fields and the database columns with which they correspond. There are a number of techniques for determining this. In one approach, the SBA deduces the relationship between form inputs and the SQL query by examining the form handling program, at step 1632.

If there is only one form input field, finding the relationship between form input fields and database columns is trivial. The location of a variable in the SQL statement is matched to the one form input field. Consider a simple example, with a single input field, as follows:

The form tag text is:
<FORM ACTION="http://www.stockadvice.com/cgi-bin/stocks"METHOD="GET">
Enter code:<INPUT TYPE "text" NAME="code" SIZE= 10><br>
<INPUT TYPE="submit" VALUE="Get quote!"><br>
    The query is:
select stock_name, close
from stock_info, stock_prices
where
    stock_info.stock_code=:code_that_was_input and
    stock_info.stock_code=stock_prices.stock_code This assumes the cgi-script is compiled C-:code_that_was_input appears to be a program variable and this would match to the input field called "code". This shows that this input field corresponds to the database column stock_info.stock_code. This database column contains the set of all possible inputs to the form.

If there is more than one input field, matching input fields to database columns is more difficult. This matching may be achieved by the SBA making a request to the cgi-script (in the process specifying values for each form input field) and observing the resultant input to the database. This observation may be carried out in a number of different ways. One way is for the SBA to install an Open Database Connectivity (ODBC) sniffer or some other method, as shown at step 1634. This will detect and log queries being sent to a particular database. There are other methods that will work for a broader range of operating systems or cgi-script types. Step 1636, one of these alternatives, involves the SBA altering the form handling script (if in uncompiled form) or providing a wrapper (if compiled) so that it informs the SBA of SQL queries that it carries out.

After the SBA has monitored SQL queries (step 1634 or 1636), it then determines the relationship between form inputs and database columns by one of two methods. At step 1638, the SBA makes queries to the form interface for each page, observes the resultant SQL query and notes which form inputs match which entries in which database column.

Alternatively, at step 1640, the SBA observes and notes the form inputs and SQL queries resulting from human searchers.

Next, there are a number of alternatives for the method that the SBA uses to index the dynamic pages and the information that needs to be sent to the CI in each of these cases. The method to be used may be set by the site administrator at step 1642.

At the three decision points, steps 1644, 1646 and 1656 the decisions on which indexing method to be used are shown. Four main approaches have been outlined. For Cases 1 and 2, two methods have been given. The methods given in 1.1 and 2.1 are generally the ones preferred. For certain databases in which information is stored in multiple databases and is relatively independent, certain queries (eg joins) will result in an explosion of tuples. Using other methods such as 1.2 and 2.2 will minimize the amount of data transmitted from the SBA to the CI in these cases. This tradeoff may be determined automatically by the SBA at the time of analyzing the database and SQL queries.

2.2.2.3.1 Taxonomy of Indexing Methods

When considering the indexing methods, there are a number of alternatives which may be used for different databases and in different circumstances. For some databases it is appropriate to restrict indexing to terms that may be searched for using the interface (eg forms, Java, etc)—Cases 1 and 3. For other databases, it may be appropriate to index on all information that is stored in the database, thus allowing the retrieval of pages that would not normally be retrievable using just the information supplied by the searcher—Cases 2 and 4. In some cases, it may be expedient to analyse the database and index all inputs and/or outputs in the database (Cases 1 and 2), whilst in other cases, it may be necessary to limit indexing to those pages that have actually been retrieved by users (Cases 3 and 4).

There are two basic approaches to indexing dynamic pages, namely, to index the actual page that has been or can be generated (Cases 2.3 and 4.2), or to send the information in a form that is similar to the way that it is stored in the database (Cases 1.2 and 2.2). A third approach is a variant of this latter alternative, namely, to send tuples of information extracted from a database (Cases 1.1, 2.1, 3.1 and 4.1). This "tuple method" is very generally applicable, and is useable even when there is no direct access to the database, although in the rare case of joins of independent tables Cases 1.2 or 2.2 will be more efficient, as discussed previously, and may be automatically selected by the SBA.

The different methods are summarised as follows:

| | | |
|---|---|---|
| Case 1: | | Index the inputs of all possible dynamic pages |
| | Case 1.1: | The SBA determines and sends all possible input tuples (step 1658) |
| | Case 1.2: | The SBA sends all database columns used by the form handling program to extract data from the database used to create the dynamic page (eg SQL "where" clause (step 1660)) |
| Case 2: | | Index the full-text of all possible dynamic pages |
| | Case 2.1: | The SBA determines and sends the static text and all possible input/output tuples (step 1662) |

In the example the query that must be executed by the SBA is:

select stock_info.stock_code, stock_brokers.name, rating, stock_name, email
from stock_info, stock_rating, stock_brokers
where
   stock_info.stock_code=stock_rating.stock_code and
   stock_brokers.name=stock_rating.name;
giving the following input/output tuples:

| Inputs | | an input tuple (cases 1.1 & 3.1) | Outputs | an input/output tuple (cases 2.1 & 4.1) |
|---|---|---|---|---|
| STOCK_CODE | NAME | RATING | STOCK_NAME | EMAIL |
| AOL | smith | hold | America Online | smith@aol.com |
| AOL | jackson | buy | America Online | jackson@aol.com |
| AOL | andrews | buy | America Online | andrews@aol.com |
| MSFT | smith | hold | Microsoft Corp | smith@aol.com |
| MSFT | jackson | hold | Microsoft Corp | jackson@aol.com |
| YHOO | jackson | sell | Yahoo | jackson@aol.com |
| YHOO | andrews | sell | Yahoo | andrews@aol.com |
| CNN | andrews | hold | CNN | andrews@aol.com |

-continued

| | | |
|---|---|---|
| | Case 2.2: | The SBA sends the static text and all database columns that: |
| | | (i) are used by the form handling program to extract data from the database used to create the dynamic page, and |
| | | (ii) are output columns, (step 1664) |
| | Case 2.3: | The SBA generates an index of all possible dynamic pages as if they were static pages |
| Case 3: | | Index the inputs of pages that have been retrieved by human searchers (step 1648) |
| | Case 3.1: | The SBA observes user inputs entered by human searchers and sends input tuples |
| Case 4: | | Index the full-text of pages that have been retrieved by human searchers (step 1650) |
| | Case 4.1: | The SBA observes user inputs entered by human searchers and resulting outputs and sends these as input/output tuples |
| | Case 4.2: | The SBA indexes the retrieved dynamic pages as if they were static pages |

Case 1 is a subset of Case 2. Case 1 involves sending data that allows searching on form inputs only, as shown in steps 1658 and 1660. Case 2 involves sending data that allows searching on full-text. Hence, Case 1 is the same as Case 2 except that no outputs are indexed.

Case 2 is very similar to Case 1. However, the SBA also sends the columns that are selected by the SQL query in the form-handling program. The SBA also sends static text, including the word positions of this text and also the word position of database entries that appear on the dynamic page, to allow phrase searching. Steps 1662 and 1664 are the options for dynamic page indexing corresponding to Case 2. Case 2.1

This scenario corresponds to step 1662. All possible pages have been chosen to be indexed (at step 1644) and the full-text of them is to be indexed (step 1656). It can be seen in our Stockadvice example that the set of all inputs and outputs are listed by the query that the SBA carries out. This means that a user of the search engine can search upon the form inputs or the words that appear on the dynamic page. For the latter, the corresponding inputs are those that are contained in the same tuple.

Any static text that is put on the dynamic page by the form handling program is noted at step 1666. These will generally be the same and thus may be sent once for the whole set of dynamic pages from a dynamic page creation point. Searches may also be performed on these words. The static text, the above database content (ie input/output tuples) and information such as the URL of the form-handling program are sent to the CI at step 1668.

In some sites there will be static pages that have been pre-generated from a database to speed up access by avoiding database retrieval when the page is requested. These static pages should not be indexed separately, but rather the SBA indexes them using the tuple method in the same way as for dynamic pages.

The generation of these pages is similar to SBA indexing Case 2.3. The difference is that Case 2.3 generates and indexes dynamic pages, but does not store them, while the above sites generate the pages and store them as static pages for fast access. Therefore, these generated static pages could be indexed by the SBA like any other static page, however, the tuple representation is the most compact way for a SBA to represent all these created pages, and the scripts that generate these pages can be used by the SBA when indexing. Hence, these static pages should be handled by the dynamic page tuple method (ie Case 2.1) except that static links would be generated on the search results page rather than dynamic links. Where the generated static pages are redundant with dynamic pages (ie they are a cached version of frequently accessed dynamic pages), the static version of the URL is returned by the central search engine rather than the dynamic version of the URL. The SBA determines that it is dealing with generated static pages back at step 1614. For example, the SBA may find Javascript or similar that constructs a static URL from a form input and/or discover a generating script for some subset of the dynamic pages at step 1632.
Case 2.2

This option corresponds to step 1664. In this case the CSE carries out SQL (like) queries at the time a user makes a search engine query. This is done to verify that a dynamic page specified by a particular combination of inputs results in a dynamic page with useful content.

In this method the SBA sends all database columns that:
(i) are used by the form handling program to extract data from the database used to create the dynamic page, and
(ii) are output columns.

At step 1668 the columns of the database, the static words and information such as the URL of the form handling program are sent to the CI.

Case 3.1

This case corresponds to steps 1648 and 1652. This approach is substantially different. It does not involve querying the database to extract all possible pieces of data that can be used in the construction of a dynamic page. Rather, the SBA just makes a note of the queries that are made to the form interface at step 1648. For efficiency reasons the SBA only sends the observed input tuples after it has observed a number of them. This is done at step 1652.

The advantage of this approach is that the information being indexed at the CI is being filtered for its usefulness—it will only be indexed if it is being used.

One approach is where the SBA installs an ODBC sniffer (earlier steps have possibly already required its installation). This ODBC sniffer watches the inputs coming into a backend database from a form handling program. Earlier upon inspecting the form handling program, the SBA will have seen the words in the SQL query, so that it will be able to recognize it again. The SBA will have also worked out the mapping from form input fields to variable slots in the SQL query. This means when the SBA sees the SQL query at runtime it will be able to recognize what values were placed into form inputs.

In addition, the SBA extracts static text that appears on the dynamic pages. The SBA may also send the word positions of these words and also the word position at which words extracted from the database are inserted, to allow phrase searching.

The SBA then needs to check that the query returns a non-empty result set, by re-executing the query itself or some other method. If the result set was non-empty the SBA can report this input tuple to the CI.

The SBA may keep just a list of queries, and only send the top few, above a threshold, to the CI. Alternatively, the SBA may report a query to the CI after its incidence passes a certain preset threshold.

Case 4.1

This case is implemented in steps 1650 and 1654. This case is very similar to Case 3.1. The only difference is that the SBA, upon seeing a user query to the form interface, also notes the values returned by the SQL query. This may be done by the SBA repeating the query itself or by some other method.

The SBA can now send the whole input/output tuple to the CI. Once again dynamic pages will be indexed at the CI according to their usefulness.

In addition, the SBA extracts static text that appears on the dynamic pages. The SBA sends the word positions of these words and also the word position at which words extracted from the database are inserted, to allow phrase searching.

Cases 2.3 and 4.2

In these cases the SBA generates an index of all possible dynamic pages as if they were static pages. Hence the detailed methods discussed for indexing dynamic pages do not apply in these cases.

2.2.2.4 CI Storage Requirements

Cases 1 and 2 will generally require more storage at the CI than Cases 3 and 4. This is because the first two cases attempt to index all possible dynamic pages at a site. The second two cases attempt to index just the most popular dynamic pages at a site.

2.2.2.5 Database Triggers

Step 1668 marks the end of the indexing that is performed directly after installation of the SBA. From step 1670 onwards the problem of sending changes to the database is addressed.

A significant problem with any search engine index is maintaining the currency of the information in it. Given the large stores of information in backend databases it is important that the central search engine is up-to-date.

One method for achieving this is by using database triggers. The SBA may install database triggers that communicate with it when columns which affect the indexing information of dynamic pages change.

A typical database allows only one trigger of a particular type per database table. For this reason it is convenient for the SBA to construct a single trigger per table that notifies the SBA of changes relevant to any dynamic page creation points that make use of that table, at step 1670. At step 1672, the SBA installs triggers that have been constructed in all databases used by entries in dyndb_list.

The following is an example trigger that might be installed on the stock_info database table in the Stockadvice example. This would be the trigger used if full-text indexing was being used (ie Cases 2 and 4). If just inputs were being indexed then only the stock_code column would need to be checked. There is also a need for triggers on the other database tables in the Stockadvice example.

---

```
CREATE or REPLACE TRIGGER sender0
AFTER INSERT or UPDATE OF stock_code, stock_name
ON stock_info
FOR EACH ROW
DECLARE
  Msg varchar(30);
  PipeName varchar(30);
  LastStatus integer;
  TraceMode varchar(30);
BEGIN
  PipeName := 'Slavko';
  LastStatus := 0;
  if (:new.stock_code is not null) then
    Msg := Msg ||':stock_info:'||'stock_code:'|| :new.stock_code;
  end if;
  if (:new.surname is not null) then
    Msg := Msg ||':stock_info:'||'stock_name:'|| :new.surname;
  end if;
  DBMS_PIPE.pack_message(Msg);
  LastStatus := DBMS_PIPE.send_message(PipeName);
  DBMS_OUTPUT.put_line('message sent');
END;
```

---

This trigger will notify the SBA of changes to the relevant database columns when they occur, by using database pipes. When the SBA learns of a change it informs the CI, at step 1678. It can do this immediately or can wait until a batch of updates has accumulated.

If the indexing information is being sent as the database columns this is trivial. If a row is inserted then the SBA sends this new row to the CI. The CI adds it into the forward index entry, and puts the words from it into the inverted index. If a row has been deleted, it identifies which row number. The SBA tells the CI and it removes the row from the forward index. It looks through the inverted index and removes the old words also. If a row has been updated then the row number is known. The CI takes this row and changes the values appropriately. Any new words are added to the inverted index. The words that have been deleted are removed from their inverted index entries.

If the indexing information is being sent as tuples, after a change is made to a database row, the SBA can carry out a query that selects the tuples affected by this change. For example if the broker called 'jackson' changes his name to 'stevens', the search to detect the changed tuples for the example could be:
select stock_info.stock_code, rating, stock_name, email
from stock_info, stock_rating, stock_brokers
where
   stock_brokers.name='stevens' and
   stock_info.stock_code=stock_rating.stock_code and
   stock_brokers.name=stock_rating.name;
giving the result:

| STOCK_CODE | RATING | STOCK_NAME | EMAIL |
|---|---|---|---|
| AOL | buy | America Online | jackson@aol.com |
| MSFT | hold | Microsoft Corp | jackson@aol.com |
| YHOO | sell | Yahoo | jackson@aol.com |

The SBA calculates affected tuples for all form handling programs that access the particular database column that is changed. The CI locates all the old tuples and removes or updates them.

2.2.2.6 Structure of the CI 214 and Behaviour of the CSE 216

Figure 17:
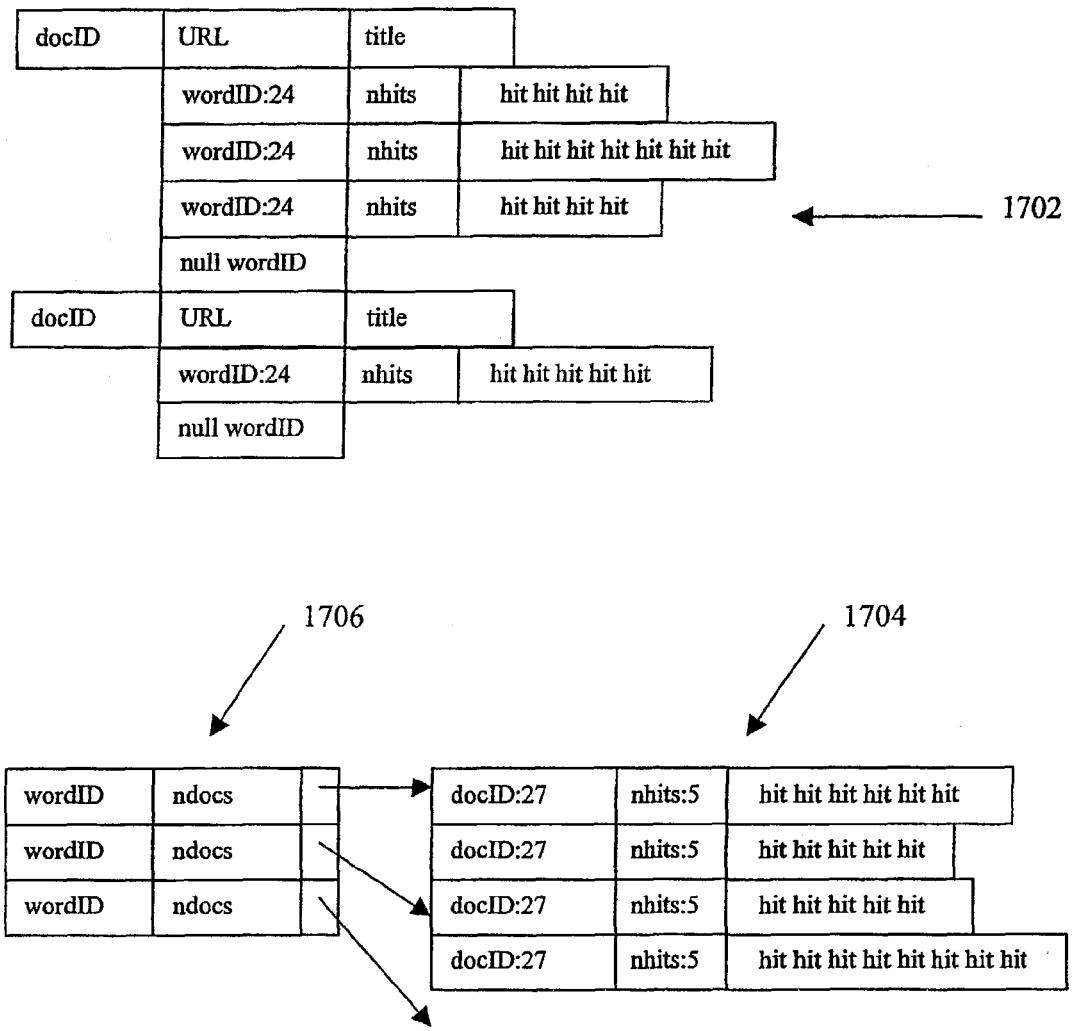
FIG. 17 is a diagram showing an example structure for static page index entries in the forward and inverted indexes of the central index.
Figure 18:
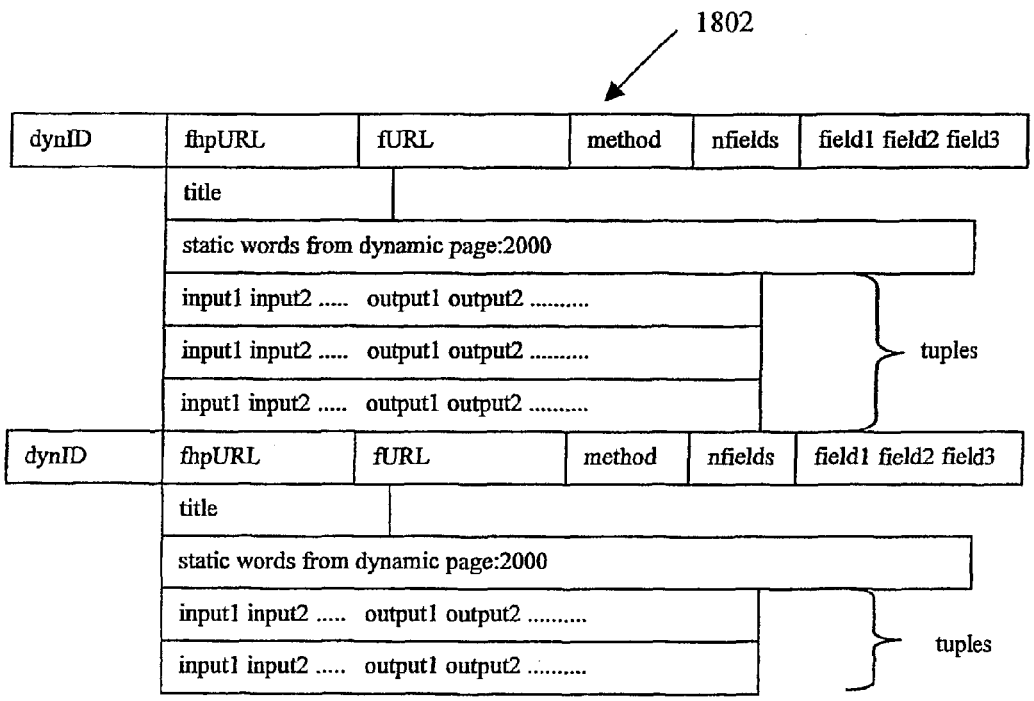
FIG. 18 is a diagram showing an example structure for dynamic page index entries in the forward and inverted indexes of the central index.
Figure 18:
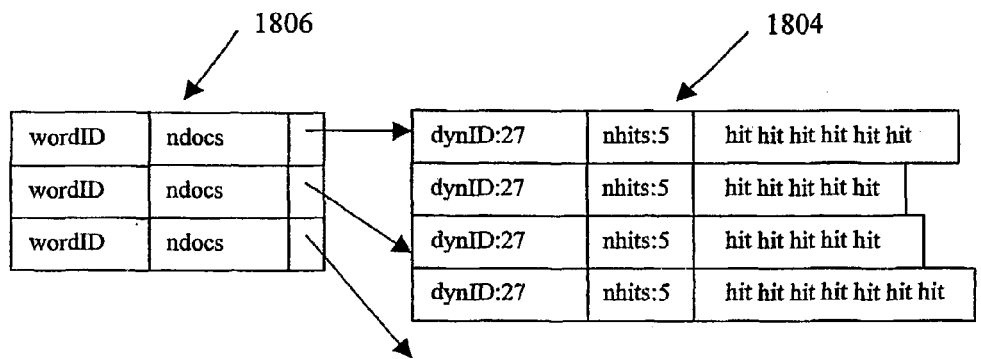

The basic structure of the CI includes a forward index and an inverted index. For static pages, information is stored in these indexes using established techniques as used by existing search engines. Examples of forward index entries 1702 and inverted index entries 1704 for static pages are shown in FIG. 17, together with example entries 1706 for the Lexicon (the notation "field:x" denotes x bits for the field). The format of the hits may comprise 16 bits, with 12 bits for the position of a word or term in the documents and 4 bits for other information, such as text capitalisation. The structure used by the CI for forward index entries 1802 for dynamic page creation points, involving the storage of tuples, as in Cases 2.1 and 4.1, is shown in FIG. 18, with inverted index entries 1804 for Cases 2.1 and 4.1, and Lexicon entries 1806 used with the inverted index. In this case, the format for a hit is simply the tuple number, which may be stored using 16 bits.

FIG. 18 is an example of a CI structure using forward and inverted index entries for indexing dynamic pages. The forward index contains blocks of information about whole dynamic page creation points. Each of these blocks is indexed with a number (dynID).

Within these blocks the tuples or columns of information sent by the SBAs are stored, as described previously.

In addition to the columns or tuples there are a number of other pieces of information related to the dynamic page creation point that will have been sent by an SBA. These include the URL of the form page (fURL in FIG. 18), the URL of the form handling program (fhpURL in FIG. 18), the method of the form (GET or POST) (method in FIG. 18), the number of form input fields (fields in FIG. 18), their names (field1 field2 in FIG. 18) and the database columns they correspond to. There will also be meta-information such as the title of the form page (title in FIG. 18), the initial text from the form page and a list of static words that occur on the dynamic pages.

For Case 1.2 or Case 2.2 the SQL query used by the form handling program will also be stored in the forward index entry. Also, instead of tuples being stored one after the other, the database columns mentioned in the SQL query will be stored. Note, as an alternative to storing the database columns in the forward index they can be stored in a standard database. This will allow easier execution of the SQL query.

The inverted index contain blocks of information on a particular word, indexed by a wordID. These blocks of information will consist of a list of dynIDs, each dynID followed by a list of occurrences of the word, 'hits', for that dynamic page creation point. The dynID) refers to the ID number for a dynamic page creation point. The actual nature of the hits depends on the indexing method that has been used for a dynamic page creation point. The dynID also points to information connecting inputs and outputs to static word positions on the dynamic page to allow phrase searching.

2.2.2.7 Description of Hits

A hit in the inverted index for Cases 1.1, 2.1, 3.1 and 4.1 is simply the number of the tuple in which the word occurs. The tuple number refers to the position of the tuple in the list of tuples for that dynID in the forward index, as shown in FIG. 18.

For Cases 1.2 and 2.2 a hit in the inverted index refers to the column and row in which the word occurs in the forward index.

A hit for a static page, or the static text on a dynamic page as in cases 2.3 or 4.2, is simply its word position on the page, plus other information like text attributes, as shown in FIG. 17.

2.2.2.8 Interaction Between the CSE and CI for the Stockadvice Example

The data that is sent to the CI in the Stockadvice example for Case 2.1 or 4.1 has the following tuples:

| STOCK_CODE | NAME | RATING | STOCK_NAME | EMAIL |
|---|---|---|---|---|
| AOL | smith | hold | America Online | smith@aol.com |
| AOL | jackson | buy | America Online | jackson@aol.com |
| AOL | andrews | buy | America Online | andrews@aol.com |
| MSFT | smith | hold | Microsoft Corp | smith@aol.com |
| MSFT | jackson | hold | Microsoft Corp | jackson@aol.com |
| YHOO | jackson | sell | Yahoo | jackson@aol.com |
| YHOO | andrews | sell | Yahoo | andrews@aol.com |
| CNN | andrews | hold | CNN | andrews@aol.com |

All the tuples will be stored as they are in the forward index. The CSE notes which of the columns in the tuples correspond to form inputs—the first two in the case of the Stockadvice example.

A user is able to perform a search for 'jackson' AND 'Yahoo' (where AND is a boolean operator). The CSE recognizes from its inverted index entry, the tuples in which at least one of these words occur. A pre-results list contains all dynIDs that have any tuples matching one of the search words. The list will have a pre-results entry for the broker.html dynamic page creation point that contain three tuple numbers for tuples that contain the word 'jackson' and two tuple numbers for tuples that contain the word 'Yahoo'.

The CSE then identifies those dynIDs that have tuples that contain both of the search words (since the user requested an AND search) and the tuple numbers of these tuples. In the Stockadvice example there is one tuple that contains both search words, hence the dynID for broker.html is returned.

The CSE then looks at the inputs for the tuple number returned, ie tuple 5, to create the query string. In this case the inputs are the first two columns of the tuples. In tuple 5 the values are 'YHOO' and 'jackson'. As the form field names are also stored in the forward index entry the CSE is able to construct the query string, which is:
scode=YHOO&bname=jackson.

The CSE also checks the URL of the form handling program (also stored in the forward index)—in this case it is:
http://www.stockadvice.com/cgi-bin/brokerdata The CSE then puts these together to construct the overall URL of the dynamic page as follows:
http://www.astockadvice.com/cgi-bin/brokerdata?scode=YHOO&bname=jackson.

A search may also include other words that appear on the dynamic page. With reference to the Stockadvice example and FIG. 9C in particular, the word 'broker' appears on all the dynamic pages. In this case there would be a hit in the inverted index, with dynID 5000 as well. It would be marked as a hit on a static word.

2.3 Indexing Applet Pages

Applets are another method commonly used to access databases. An applet is a small program written in Java. An applet can be named in the html code of a web page, and when a user views that web page, the applet, along with the web page are downloaded to the user's computer. The applet program is then automatically run. The applet can present boxes for entering text on the web page, and buttons to click to submit this text. Upon submission, the applet can generate a change in appearance on the page, to show the results of the query.

These pages are not dynamic pages in the sense discussed previously, but they do have the feature of being able to accept user input and then display results drawn from a backend database.

There are two main ways that a database may be accessed from an applet. First, the applet may contain the statements for connecting to a database itself. The other main option is that the applet does Remote Method Invocation on another Java class which in turn carries out the database access.

2.3.1 Server Based Agent for Applets

When the SBA is first installed it looks though the web site's directory tree, checking each html page. As described previously, an SBA is able to identify pages that contain a form tag. In this case, it also looks for pages that contain an applet tag.

To narrow these pages to applets that only access databases, the SBA looks at the ascii strings from the Java binary, and identifies an SQL query. If the applet itself accesses the database the SBA should find an SQL query in the strings from the applet. If an SQL statement is found, then this page is considered to be one whose output involves accessing a database.

The other case is that the applet may call, using Remote Method Invocation, a class that does the database query. This Java class called by the applet must be in the same directory as the applet code. Also, the names of any classes called by the applet will occur in the list of strings for the applet. Therefore, the SBA checks through the strings extracted from each class that is named in the applet code, and occurs in the applet's directory on the machine hosting the web site directory tree. If any of these contain SQL statements, then the original page that contained the applet tag is considered to be a page that accesses a backend database.

The determination of username and password occurs in a similar way to form handling programs, as described previously. The strings in the binary are identified. The username and password are specified in a Java Database Connectivity (JDBC) connection statement. Further to connecting to the database, the SBA needs to determine the information for the JDBC URL. In the case of the applet, the JDBC URL will already be present—so the SBA has direct access to it.

This case involves indexing applet pages that use text field inputs to access a backend database. The SBA then determines the names of the text field inputs used to access the database. This is equivalent to the names of the form input fields discussed earlier. The SBA achieves this by making a subclass of the applet, which looks at the names of the applet's fields.

```
class Extract extends OriginalApplet{
    public static void main(String□ argv){
        Field□ fds = OriginalApplet.getFields( );
    }
}
```

The SBA then considers the SQL query used by the applet, as this was found earlier to verify that the applet accesses a backend database.

The process of matching text fields to database columns is the same as for form handling programs. The SBA installs an ODBC sniffer, which monitors queries sent to the backend database. The SBA then sends a query to the applet and monitors the SQL query that is produced.

The structure of the CI and the information sent to the CI from the SBA is generally the same as for the dynamic page case. This information includes the input tuples or database columns corresponding to text field inputs.

In order to create a clickable link on the search engine's results page, the SBA installs a new applet at its site that is a subclass of the original applet. The SBA also installs a new page that includes the new applet.

The link that appears on the search engine's results page will be to another script installed by the SBA. This script reads the query string sent by the search engine, and alters the applet tag on the page that includes the new applet by including the query string that has been sent by the search engine as a parameter. The script then redirects to the page that includes the new applet. The new applet is a subclass of the original. In its init( ) method it will read in the query string, set the text in the text fields accordingly and mimic the clicking of the submit button. An example of part of this code follows:

```
public class ResultApplet extends DBApplet{
  Button submit = new Button("Enter");
  public void init( ){
    super.init( );
    field1.setText("sometext");
    SubmitActionListener sal = new SubmitActionListener(this);
    submit.addActionListener(sal);
    sal.actionPerformed(null);
  }
}
```

2.3 Web Server Statistics

An SBA may also collect useful statistical information about its local server. There are a number of ways in which an SBA may collect this information including:
(i) accessing log files produced by the local server
(ii) monitoring HTTP connections directly
(iii) in the case of an SBA that is integrated with the server, by accessing internal data structures.

The statistics that may be collected by the SBA are numerous, and include:
(i) the number of hits to a page or site
(ii) the page that was linked from (ie the page from which the user came from to reach this page, and this can include the search engine keywords used (obtainable from the URL of the search) if the user came from a search query page
(iii) the amount of time spent at a page, page set or web-site
(iv) demographic information about the users such as their address, location, etc
(v) bandwidth statistics of the server, including time between packets of a single page, and time between page elements (eg images, applets, sounds, etc).

This information collected by the SBA may be sent to the CI in a similar manner to other information. It may be used to:
(i) tailor search results to the demographic profile of an individual search engine user
(ii) direct users to the site which should give the fastest response (eg mirror sites, etc)
(iii) rank search engine results according to average time users spend on a page, demographic profile of the user, and/or keywords used in previous searches which found a particular page.

2.4 E-Commerce Applications

E-commerce is a specialist application of an SBA providing indexing information on dynamic pages. A CI may be used to provide.an.e-commerce portal for SBAs installed at shopping sites. Information that may be indexed includes:
(i) product name/model/manufacturer etc
(ii) price, including quantity pricing and discounts, taxes, etc
(iii) location
(iv) delivery time and freight cost options
(v) quality and reviews
(vi) picture of the product
(vii) warranty information
(viii) payment options, loyalty programs, etc The E-commerce portal may also provide searching based on one or a combination of criteria, such as price including freight, delivery time, warranty period and location, quality and reviews and payment requirements.

Purchases may occur either through the CI's portal or a user may be directed to the relevant e-commerce site.

The CI's e-commerce portal may perform total cost calculations to identify an optimal cost based on the location of the buyer and the physical location of the product (freight costs), sales tax and duty issues, etc.

The SBAs may include an e-commerce package for building an e-commerce site, and options exist for payment and freight to occur either through the CI's e-commerce portal or the local site.

Throughout the specification reference has been made to use of the indexing system in relation to the Internet, with web servers, in association with web sites in the form of html pages. However it should be appreciated that the invention is also applicable to any form of server that provides access to data that may be indexed for searching purposes.

Many modifications will be apparent to those skilled in the art without departing from the scope of the present invention as hereinbefore described with reference to the accompanying drawings.

The invention claimed is:

1. An indexing system comprising:
a plurality of server based agents corresponding to a plurality of servers, each of the servers providing access to and serving data for at least one site on the server;
each of the server based agents being associated with a corresponding server and forming an index file of site data on the agent's corresponding server and representing changes to the site data determined by the agent on the agent's corresponding server; and
a central index that stores index information formed from the index files received from the plurality of server based agents;
each of the server based agents initiating communication over the Internet with the central index to thereby transfer the agent's index file for the agent's corresponding server to the central index, the central index being used by a search engine;
at least one of the sites serving at least one dynamic page;
the index file associated with the dynamic page including inputs that will generate a valid page by a corresponding form handling program; and
each of the server based agents associated with a dynamic page identifying at least one database used to create the dynamic page, and introducing a trigger in the database to identify any changes in the database, the changes being included in an update index file associated with the dynamic page.

2. The indexing system as claimed in claim 1, wherein each index file includes information on any change affecting the validity of links.

3. The indexing system as claimed in claim 2, wherein each of the server based agents, upon identifying said link validity change, is arranged to transmit notification of the change to a corresponding server associated with another site that includes an invalid link resulting from the change.

4. The indexing system as claimed in claim 3, wherein the central index is adapted to identify a site affected by the link validity change and to transmit notification to a corresponding server associated with the affected site.

5. The indexing system as claimed in claim 3 or 4, wherein the notification is transmitted to the respective server based agent of the corresponding server which is adapted to effect action to update information on the corresponding server.

6. The indexing system as claimed in claim 3 or 4, wherein the notification is transmitted to an administrator of the corresponding server and, upon receipt of the notification, the administrator is able to effect action to update information on the corresponding server.

7. The indexing system as claimed in claim 1, wherein the index file associated with the dynamic page further includes outputs and text of the dynamic page.

8. The indexing system as claimed in claim 1, wherein the server based agent associated with the dynamic page is adapted to access the database and include one or more columns of the database in the index file associated with the dynamic page.

9. The indexing system as claimed in claim 1, wherein the index file associated with the dynamic page includes a record of inputs of pages previously retrieved therefrom by users.

10. The indexing system as claimed in claim 1, wherein the index file associated with the dynamic page includes an index of the full text of the dynamic page, previously retrieved by users.

11. The indexing system as claimed in claim 1, wherein the index file associated with each dynamic page for which input/output tuples or row/column indexing is stored further includes an identifier for identifying the form handling program and text associated with the page.

12. The indexing system as claimed in claim 1, including a server for accessing the central index in response to search queries.

13. The indexing system as claimed in claim 1, wherein each said server based agent initiates said communication by storing a file in a predetermined location.

14. A method of indexing comprising the steps of:
providing a plurality of server based agents corresponding to a plurality of servers, each server based agent being associated with a corresponding server for indexing sites located on the corresponding server that are served by said server;
having each server based agent form an index file of site data of the sites on said agent's corresponding server and representing changes to the site data determined by the agent on the agent's corresponding server;
providing a central index that stores index information compiled from the index files received from the plurality of server based agents;
having each of the server based agents initiate communication over the Internet with the central index to thereby transfer the index file for the agent's corresponding server from the server based agent to the central index, the central index being usable by a search engine,
the index file including information relating to dynamic pages of the sites,
each of the server based agents associated with a dynamic page identifying at least one database used to create the dynamic page, and extracting the text and input tuples for inclusion in the index file; and introducing a trigger in the database to report to the server based agent, when changes occur in the database, the changes being included in an update index file associated with the dynamic page.

15. The method of indexing as claimed in claim 14, wherein each server based agent records link information on the sites and any change affecting the validity of the link information is recorded in the index file formed by the server based agent.

16. The method of indexing as claimed in claim 15, including the server based agent identifying said link validity change and transmitting notification of the change to a corresponding server associated with another site that includes an invalid link resulting from the change.

17. The method of indexing as claimed in claim 15, wherein the central index has a list of site addresses and, upon receipt of an index file indicating said change, an associated site affected by the change is identified and notification is sent to the corresponding server of the affected site.

18. The method of indexing as claimed in claim 16 or 17, wherein the notification is transmitted to the respective server agent of the corresponding server which effects action to update information on the corresponding server.

19. The method of indexing as claimed in claim 16 or 17, wherein the notification is transmitted to an administrator of the corresponding server and, upon receipt of the notification, the administrator is able to effect action to update information on the corresponding server.

20. The method of indexing as claimed in claim 14, wherein the index file includes inputs to generate the dynamic pages.

21. The method of indexing as claimed in claim 20, wherein an index file includes outputs used to generate the dynamic pages.

22. The method of indexing as claimed in claim 14, wherein the server based agent extracts output tuples associated with said input tuples.

23. The method of indexing as claimed in 22, wherein said server based agent extracts columns of the database for inclusion in the index file.

24. The method of indexing as claimed in claim 14, wherein the index file includes a record of data used to generate previously retrieved dynamic pages.

25. The method of indexing as claimed in claim 14, wherein the index file includes an index of the text of dynamic pages previously retrieved by users.

26. The method as claimed in claim 14, wherein each said server agent initiates said communication by storing a file in a predetermined location.

* * * * *